United States Patent [19]

Kondo et al.

[11] Patent Number: 5,093,716

[45] Date of Patent: Mar. 3, 1992

[54] DIGITAL COLOR VIDEO CAMERA WITH AUTO-FOCUS, AUTO-EXPOSURE AND AUTO-WHITE BALANCE, AND AN AUTO EXPOSURE SYSTEM THEREFOR WHICH COMPENSATES FOR ABNORMAL LIGHTING

[75] Inventors: Toshiharu Kondo, Kanagawa; Akihiro Kikuchi, Chiba; Takashi Kohashi, Chiba; Fumiaki Kato, Chiba; Katsuaki Hirota, Kanagawa, all of Japan

[73] Assignee: Sony Corporation, Tokyo, Japan

[21] Appl. No.: 653,364

[22] Filed: Feb. 1, 1991

[30] Foreign Application Priority Data

Feb. 15, 1990 [JP] Japan .................................. 2-34793

[51] Int. Cl.⁵ ......................... H04N 5/238; H04N 9/73
[52] U.S. Cl. ...................................... 358/41; 358/29; 358/213.19; 358/227; 358/228
[58] Field of Search ................ 358/29 C, 213.19, 227, 358/228, 41

[56] References Cited

U.S. PATENT DOCUMENTS

| | | | |
|---|---|---|---|
| 4,843,474 | 6/1989 | Suzuki | 358/213.19 |
| 4,887,121 | 12/1989 | Pritchard | 358/228 |
| 4,998,162 | 3/1991 | Kondo | 358/29 C |
| 5,036,400 | 7/1991 | Haruki | 358/228 |

Primary Examiner—Howard W. Britton
Attorney, Agent, or Firm—Alvin Sinderbrand; William S. Frommer

[57] ABSTRACT

A color video camera providing a digital video signal has an auto-focus detector, an auto-exposure detector and an auto-white balance detector formed as sections of an optical detector circuit which further has serial input and output ports common to the auto-focus, auto-exposure and auto-white balance detectors, and a system controller which is common to the auto-focus, auto-exposure and auto-white balance detectors and provides control signals therefor through the serial input port while receiving focus, exposure and white-balance detection signals through the serial output port from the respective detectors. Further, an improved exposure control system is provided which compensates for abnormal lighting conditions, such as, back-lighting or excessive front-lighting of the scene in the field of view of the camera.

18 Claims, 10 Drawing Sheets

Fig. 5A
| | Cy+G | Ye+M | Gy+G | Ye+M | |
|---|---|---|---|---|---|
| --- | | | | | --- |
Fig. 5B
| | Cy+M | Ye+G | Cy+M | Ye+G | |
|---|---|---|---|---|---|
| --- | | | | | --- |
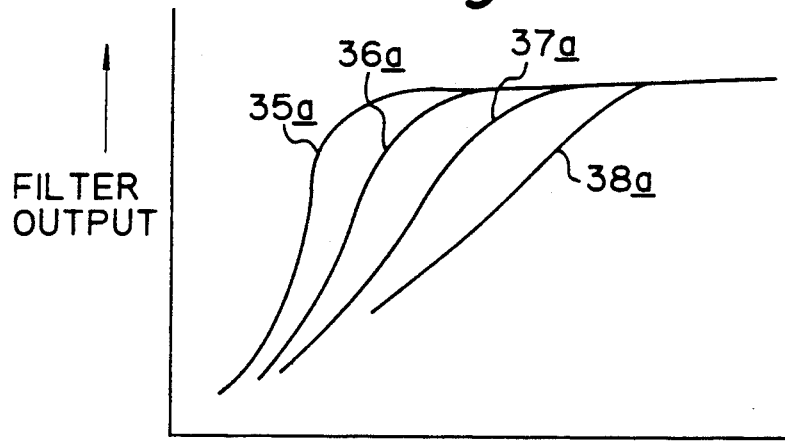
Fig. 6
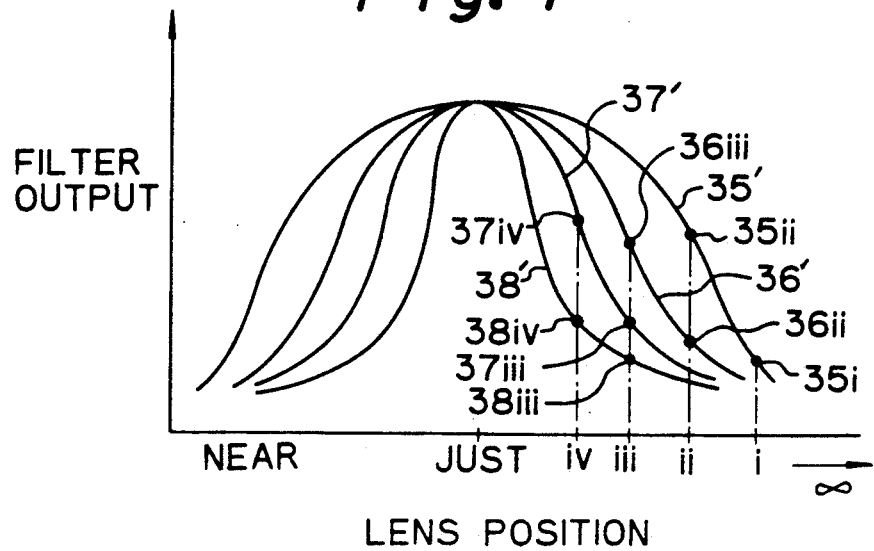
Fig. 7

Fig. 9C

Fig. 13A
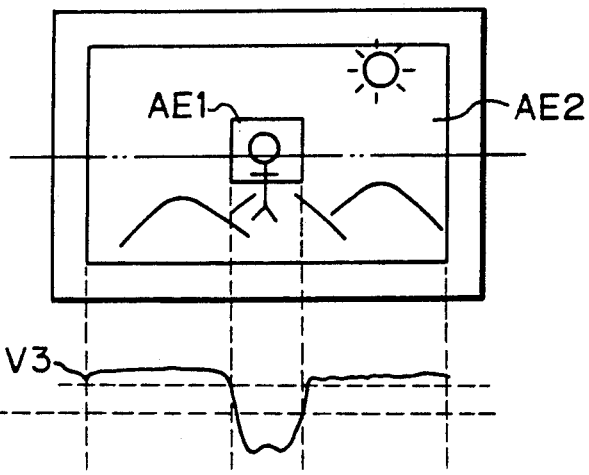
Fig. 13B
Fig. 14
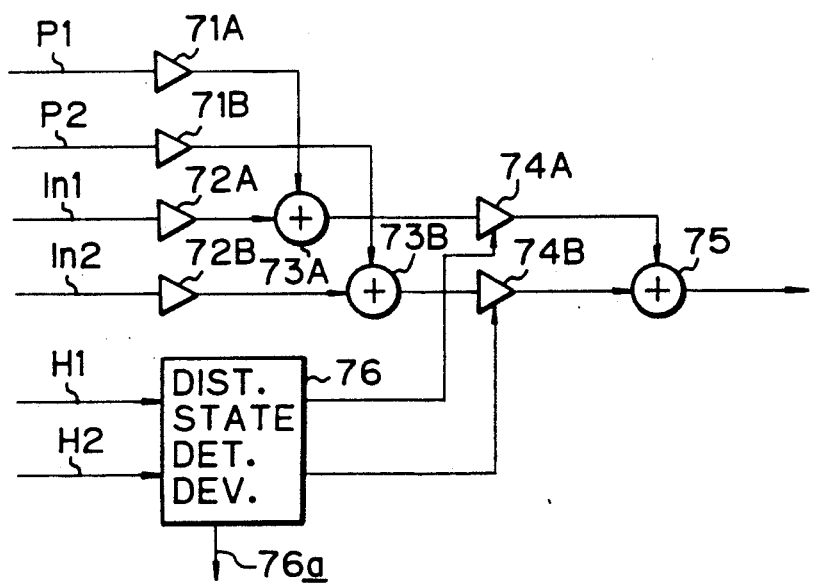

Fig. 18A  Fig. 18B
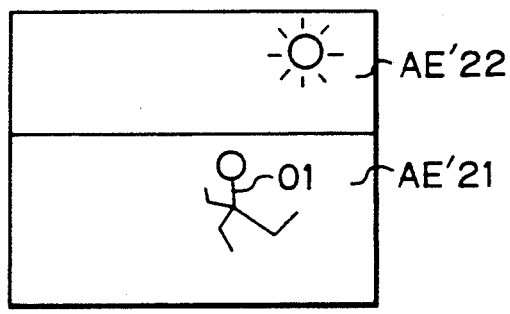
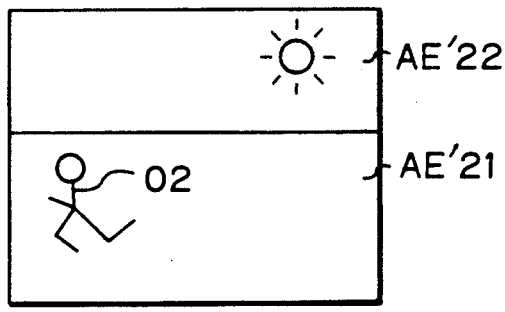
Fig. 19A  Fig. 19B
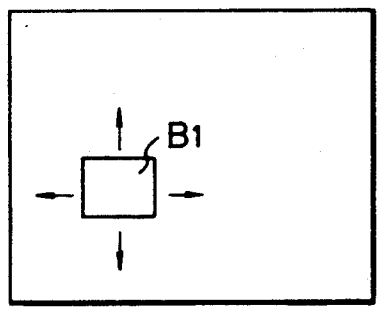
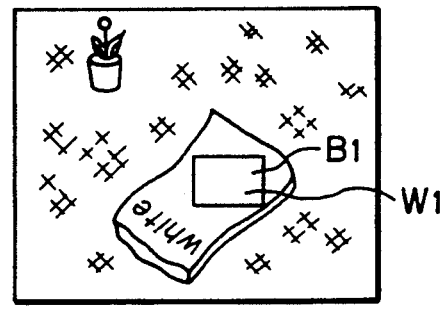

DIGITAL COLOR VIDEO CAMERA WITH AUTO-FOCUS, AUTO-EXPOSURE AND AUTO-WHITE BALANCE, AND AN AUTO EXPOSURE SYSTEM THEREFOR WHICH COMPENSATES FOR ABNORMAL LIGHTING

BACKGROUND OF THE INVENTION

1. Field of the Invention

This invention relates generally to a color video camera providing a digital video signal and having auto-focus, auto-exposure and auto-white balance functions, and further is directed to an exposure control system particularly suited for incorporation in such camera and which compensates for abnormal lighting conditions.

2. Description of the Prior Art

It has been known to provide a color video camera with analog auto-focus, auto-exposure and auto-white balance control systems. However, such analog systems are susceptible to change with variations in temperature and, therefore, do not provide the desired high degree of accuracy and reliability. Although digital control systems do provide the requisite accuracy and reliability, the incorporation of digital auto-focus, auto-exposure and auto-white balance controls in a color video camera has involved relatively bulky circuit arrangements which are unsuited for incorporation in the miniaturized or compact hand-held video cameras now provided for the consumer market.

The auto-exposure control system embodied in a conventional video camera controls the opening and closing of an iris and the gain of an auto gain control (AGC) circuit with the object of maintaining the luminance signal level in an exposure detection area of the CCD imaging device at a predetermined value. With such conventional auto-exposure control system, back-lighting of a scene in the field of view of the camera causes a large increase in the brightness level of the background and, in response thereto, the system closes the iris and decreases the gain of the AGC circuit so that an object in the foreground of the screen appears dark and inconspicuous in a picture or image displayed from the resulting video signal. On the other hand, in the event of excessive forward-lighting of the scene, the brightness level of the background is much smaller than the brightness level of objects in the foreground and, in response thereto, the conventional auto-exposure control system tends to open the iris and increase the gain of the AGC circuit with the result that objects in the foreground of the picture are saturated.

In connection with the foregoing, it has been suggested to define two exposure detection areas which respectively contain the background and the foreground objects, so as to perform center-emphasized photometry under back-lighting or excessive front-lighting conditions with the object of controlling the opening and closing of the iris and the gain of the AGC circuit so that the luminance signal level in the exposure area that contains the objects in the foreground will be maintained at a predetermined level during back-lighting and excessive front-lighting.

When auto-exposure control is performed with reference to two exposure detection areas which respectively contain the background and the foreground objects, precise detection of the lighting condition, that is, whether the scene is subjected to normal front-lighting, back-lighting or excessive front-lighting, is required. However, in the previously proposed arrangement employing two exposure detection areas, as aforesaid, only integrated values of the luminance signal levels in the respective areas are obtained and employed to determine the lighting condition. As a result, precise detection of whether the scene is being subjected to normal front-lighting or to abnormal lighting, such as, back-lighting or excessive front-lighting, is not realized.

OBJECTS AND SUMMARY OF THE INVENTION

Accordingly, it is an object of this invention to provide a digital color video camera with auto-focus, auto-exposure and auto-white balance control systems of the accuracy and reliability characteristic of digital arrangements, but which are relatively simple and compact for ready incorporation in hand-held color video camera of the small size demanded by the consumer market.

Another object is to provide an auto-exposure control system for a video camera which is capable of accurately detecting the distribution of luminance signal levels for determination therefrom of the lighting condition so as to permit accurate control of the exposure, particularly in respect to objects in the foreground of the scene in the field of view of the camera.

In accordance with an aspect of this invention, in a video camera having a lens assembly for directing incident light onto a light reception surface of a pickup so as to form thereon an image corresponding to a scene in the field of view of the lens assembly so that the image pickup will provide a luminance signal corresponding to such light image, and exposure means for controlling the amount of the light incident on the surface; there are further provided: means for defining a plurality of exposure detection areas corresponding to respective portions of the light reception surface, first detector means for detecting levels of the luminance signal corresponding to the respective exposure detection areas, second detector means for detecting distributions of the levels of the luminance signal corresponding to the exposure detection areas, respectively, as an indication of the lighting condition to which the scene is subjected, control means for controlling the exposure means in response to the first detector means, and means for controlling positions and dimensions of the exposure detection areas relative to each other in response to the second detector means.

In accordance with a feature of this invention, in a video camera having an exposure control system, as aforesaid, outputs of the first detector means which represent levels of the luminance signal corresponding to the respective exposure detection areas are weighted relative to each other. Further, in a particularly desirable arrangement in which the first detector means includes a peak detector and an integration detector for each of the exposure detection areas, means are further provided for relatively weighting outputs of the peak detector and the integration detector for each of the exposure detection areas.

In accordance with another feature of this invention, in a video camera having an exposure control system, as aforesaid, the luminance signal is applied to the integration detector for each of the exposure detection areas through a non-linear transfer means having a characteristic which relatively reduces the effects of high amplitudes of the luminance signal on the outputs of the respective integration detectors. Further, means are preferably provided for changing the characteristic of the non-linear transfer means in response to the distributions of the levels of the luminance signal corresponding to the respective exposure detection areas as determined by the second detector means.

In accordance with still another feature of this invention, in a video camera having an exposure control system, as aforesaid, the plurality of exposure detection areas include first and second exposure detection areas which respectively correspond to central and peripheral portions of the light reception surface of the image pickup, or third and fourth exposure detection areas which respectively correspond to portions of such light reception surface extending thereacross one above the other, and the means for controlling positions and dimensions of the exposure detection areas selects the first and second areas when the second detector means detects distributions of the levels of the luminance signal indicating back-lighting or excessive front-lighting of the scene, whereas the third and fourth areas are selected when the second detector means detects distributions of the levels of the luminance signal which indicate normal front-lighting of the scene.

The above, and other objects and advantages of the invention, will be apparent in the following detailed description of an illustrative embodiment which is to be read in connection with the accompanying drawings forming a part hereof, and in which corresponding parts and components are identified by the same reference numerals in the several views of the drawings.

BRIEF DESCRIPTION OF THE DRAWINGS

FIGS. 5A and 5B are diagrammatic views to which reference will be made in explaining how the optical detector shown in FIG. 4 separates luminance and chrominance components from the video signal produced by the checkerboard pattern shown in FIG. 3;

FIG. 6 is a graphical representation of the frequency characteristics of the digital high pass filters used in the optical detector of FIG. 4;

FIG. 7 is a graphical representation of the spectral characteristics of the digital filter circuits as a function of the focus condition of the lens included in the video camera of FIG. 1;

FIGS. 9A-9D are waveform diagrams which are useful in understanding another aspect of the present invention;

FIGS. 13A and 13B are diagrammatic views to which reference will be made in explaining auto-exposure control when a scene being imaged is back-lighted;

FIG. 14 is a schematic representation of a circuit that may be used with the auto-exposure control portion of the optical detector shown in FIG. 4;

FIGS. 18A and 18B are views similar to FIGS. 17A and 17B, but showing exposure detection areas used for normal front-lighting so that panning does not affect the automatic exposure control; and FIGS. 19A and 19B are diagrammatic views to which reference will be made in explaining the operation of a white balance detector included in the optical detector of FIG. 4.

DETAILED DESCRIPTION OF PREFERRED EMBODIMENTS

Figure 1:
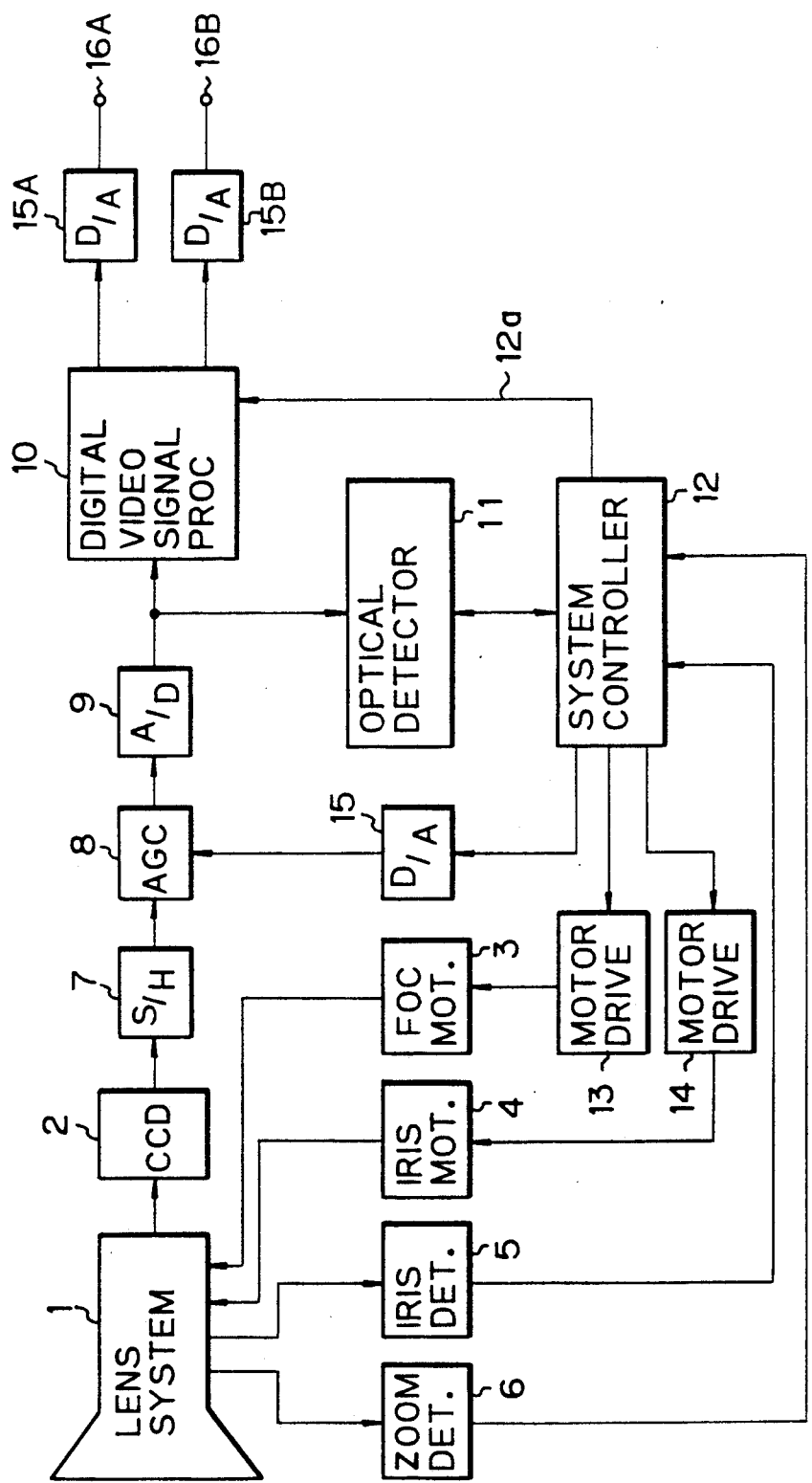
FIG. 1 is a block diagram of a video camera embodying the present invention.
Figure 2:
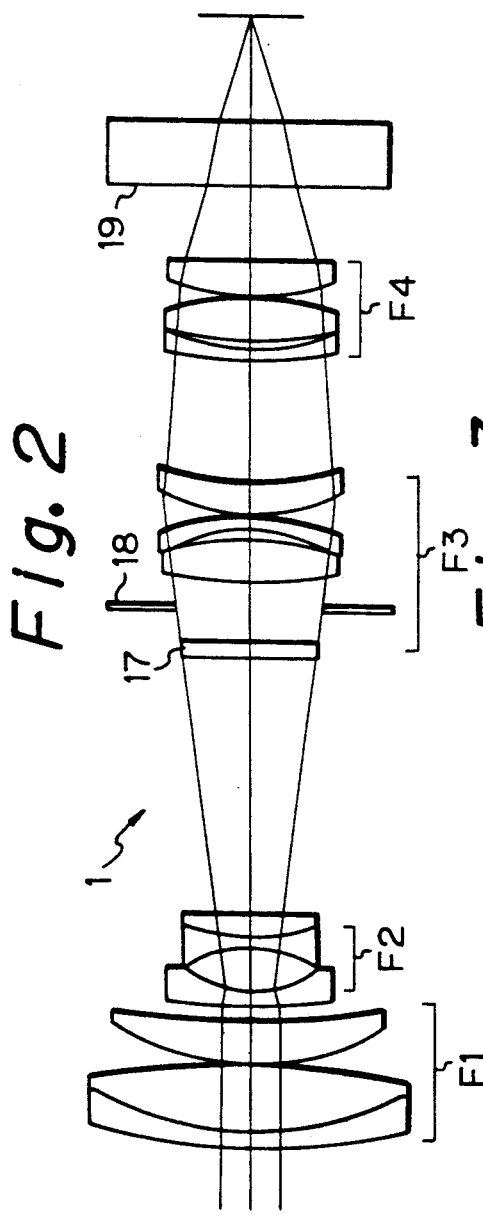
FIG. 2 is a schematic representation of a lens system which is included in the camera of FIG. 1.

Referring initially to FIG. 1, it will be seen that a video camera with which the present invention may be used is there shown to be similar to that described in the aforementioned application Ser. No. 07/393,804. Such video camera generally includes a lens system 1 which preferably includes zoom lens elements and an adjustable lens group for focusing the lens system between near and far (infinity) focus conditions. As referred to herein, the expression "just-focused" means that the lens system is properly focused on an object being imaged. Lens system 1 is illustrated in FIG. 2 to be comprised of lens groups F1, F2, F3 and F4, wherein lens group F2 constitutes a zoom lens arrangement and lens group F4 constitutes a focus lens system. A PN filter 17 is disposed between lens groups F2 and F3, and an adjustable aperture 18, such as an adjustable iris, is illustrated adjacent the PN filter for achieving exposure control. An infrared inhibitor 19 serves to remove infrared radiation from the optical image which is focused by the lens system 1 onto an imaging device 2 (FIG. 1)

Lens group F4 is driven by a focus motor 3 (FIG. 1). Iris 18 is driven by an iris motor 4 to increase or decrease the size of the aperture and, thus, the exposure of lens system 1. The focus and iris motors 3 and 4 are controlled by a system controller 12 through driver circuits 13 and 14, respectively. The system controller 12 receives signals from an iris position detector 5 and a zoom position detector 6 which respectively indicate the positions of the iris 18 and the zoom lens group F2, respectively. The manner in which the system controller 12 operates to adjust the iris 18 and the zoom lens group F4 will be later described.

Figure 3:
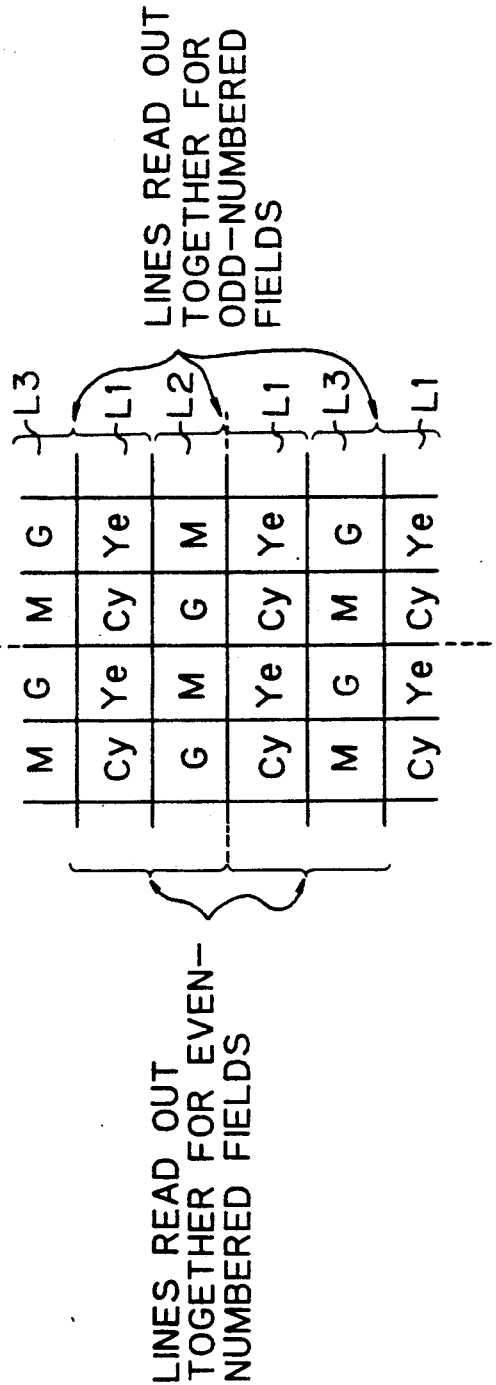
FIG. 3 is a schematic representation of a complementary-colored checkerboard pattern that may be used with an image pickup device of the video camera shown in FIG. 1.

The imaging device 2, which is preferably, comprised of a CCD array of the type shown in FIG. 3, is adapted to generate a video signal corresponding to an optical image projected thereon by the lens system 1 as the individual elements which comprise the CCD array are scanned. As shown in FIG. 3, the CCD array is comprised of rows and columns of pixel elements arranged in a complementary-colored checkerboard pattern. This pattern is comprised of successive rows or lines L1, L2, L1, L3, L1, L2, etc., wherein each line L1 is formed of alternating cyan and yellow pixel elements Cy, Ye, Cy, Ye, etc., each line L2 is comprised of alternating green and magenta pixel elements G, M, G, M, etc. and each line L3 is comprised of alternating magenta and green elements M, G, M, G, etc. In one embodiment, each row of CCD image pickup device 2 is comprised of 510 pixel elements; and in another embodiment, each row is comprised of 760 pixel elements. The pixel elements in a row are scanned successively on a row-by-row basis. For the embodiment in which a line is comprised of 510 pixel elements, the pixel elements are scanned at a scanning clock frequency $(8/3)f_{SC}=9.55$ MHz. In the alternative embodiment in which each line is comprised of 760 pixel elements, the successive pixel elements are scanned at a scanning clock frequency $4f_{SC}=14.32$ MHz.

Returning to FIG. 1, each scanned pixel element produces a pixel signal level of a magnitude determined by the brightness of the respective point in the image projected on imaging device 2. Successive pixel levels in the signal output of the device 2 are sampled by a sample-and-hold circuit 7 and each sample is converted to digital form by an A/D converter 9 after passing through an automatic gain control (AGC) circuit 8. The AGC circuit 8 preferably is an analog circuit supplied with a gain setting voltage from system controller 12. The system controller 12 includes a microprocessor and produces a digital gain controlling signal which is converted to analog form by a D/A converter 15.

As will be discussed below in conjunction with FIGS. 5A and 5B, the complementary colored checkerboard pattern comprising CCD pickup device 2 is scanned or read so that each scan output is comprised of the sum of the pixel level of two vertically adjacent pixel elements, that is, two adjacent rows are read simultaneously. For example, a pixel element in row L1 and a vertically aligned pixel element in row L2 are scanned together, followed by the next pixel element in row L1 and a vertically adjacent or aligned pixel element in row L2. Similarly, when adjacent rows L1 and L3 are scanned together, one pixel element in row L1 is scanned concurrently with a vertically aligned pixel element in row L3. These vertically adjacent pixels are summed and the result thereof is sampled by the sample-and-hold circuit 7.

A/D converter 9 preferably produces a 10-bit digital signal representing each sample produced by the sample-and-hold circuit 7. The digitized samples are supplied from A/D converter 9 to digital video processor 10 and also to an optical detector 11. The optical detector 11 generally includes an auto-focus (AF) detection circuit, an auto-exposure (AE) detection circuit and an auto- white balance (AWB) detection circuit, which will be described in greater detail in conjunction with FIG. 4. The AF, AE and AWB detection circuits produce auto-focus, auto-exposure and auto-white balance detection signals, respectively. These detection signals are supplied from optical detector 11 to system controller 12 whereat they are used to control driver circuit 13 for the focus motor 3 so as to adjust the focus condition of lens system 1, to control driver circuit 14 for the iris motor 4 and thereby vary the exposure aperture of iris 18 so as to control the exposure condition of the video camera, and to control the digital video processor 10 in accordance with the detected white balance of the image picked up by the video camera. System controller 12 also produces the gain setting signal for the AGC circuit 8 in response to the detected exposure level sensed by the optical detector 11.

Optical detector 11 and system controller 12 are interconnected by way of a serial interface, whereby the AF detection signal, AE detection signal and AWB detection signal produced by optical detector 11 are supplied as AF, AE and AWB control signals by way of a serial output port from the optical detector 11 to the system controller 12; and whereby control signals produced by system controller 12 ar applied to the optical detector 11 by way of a serial input port. It is appreciated that a serial interface reduces the complexity, bulk and weight of the interconnections between the optical detector 11 and the system controller 12. Preferably, the signals communicated between the optical detector and the system controller exhibit a periodicity corresponding to the vertical period intervals of the video signal.

Digital video signal processor 10 produces luminance and chrominance signals corresponding to the digitized samples supplied thereto by A/D converter 9. The manner in which the digital video processor 10 operates forms no part of the present invention per se and, therefore, is not further described herein. Suffice it to say that the digitized luminance and chrominance signals produced by the digital video processor are converted to analog form by D/A converters 15a and 15b, respectively. As a result, analog luminance and chrominance signals are supplied to output terminals 16a and 16b, respectively, from which they may be recorded, displayed or processed further.

Figure 4A:
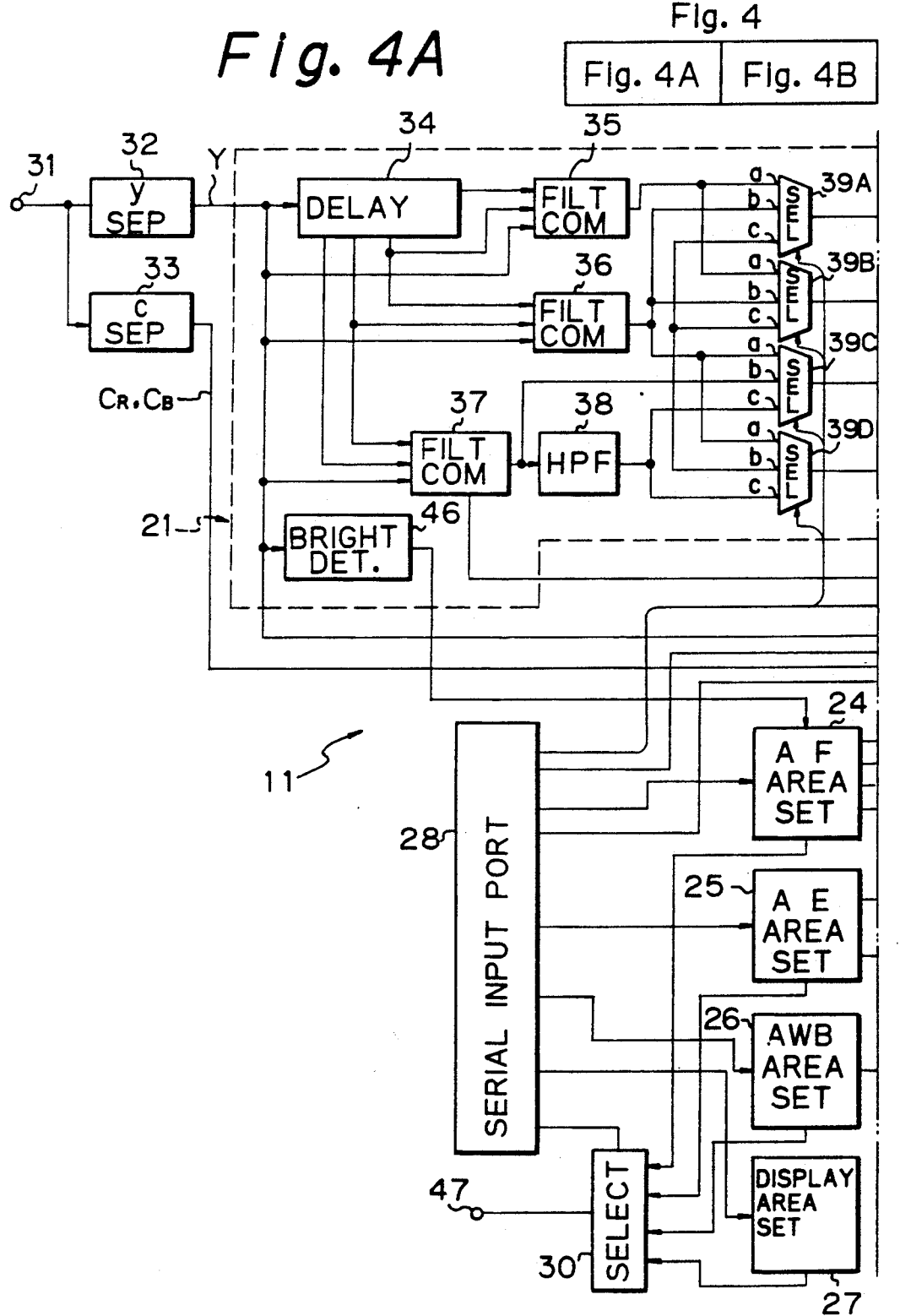
FIG. 4 is a block diagram of an optical detector included in the video camera of FIG. 1 in accordance with the present invention.
Figure 4B:
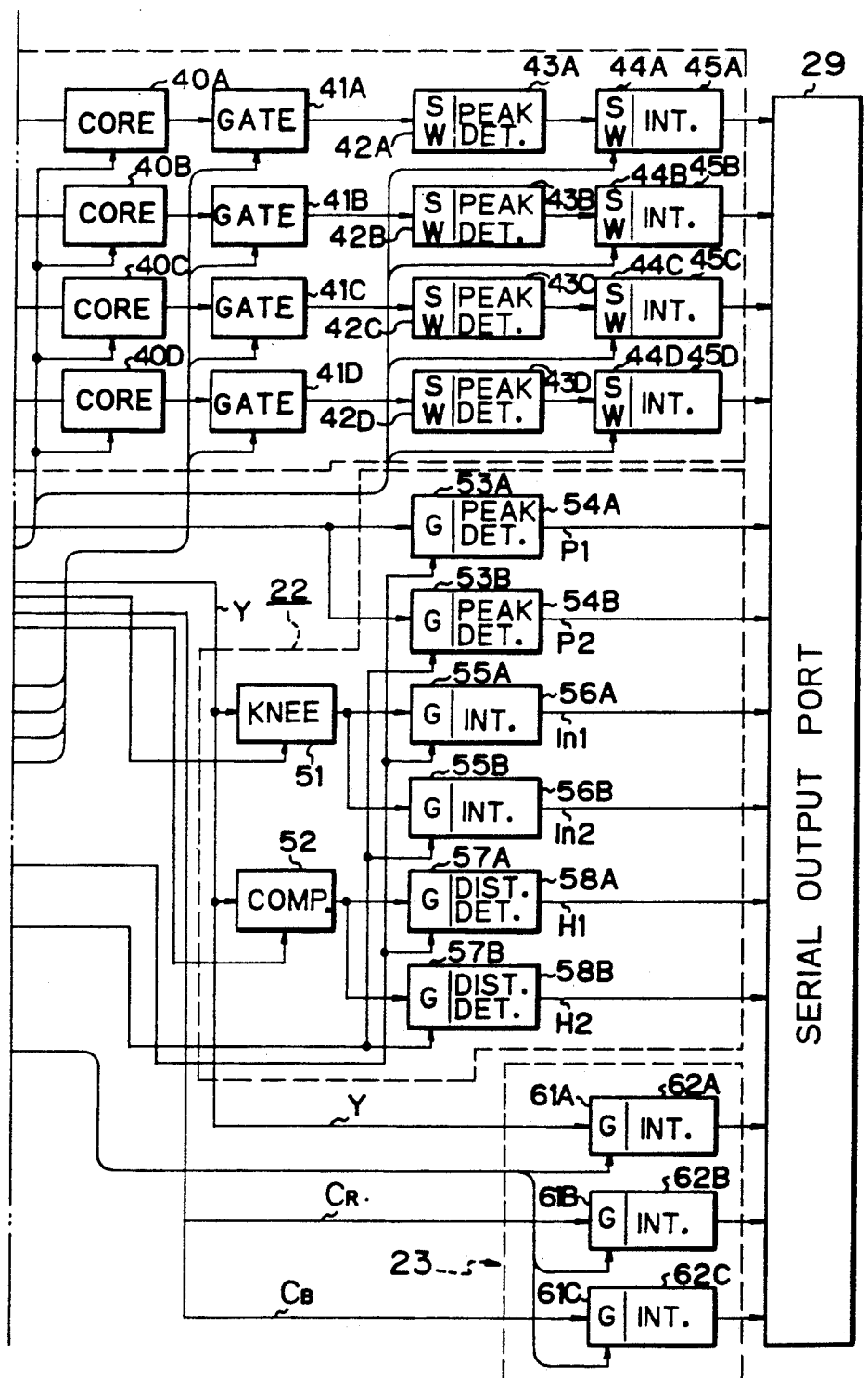

Referring now to FIG. 4, there is illustrated a more detailed block diagram of the optical detector 11 which is shown to comprise an auto-focus detector 21, an auto-exposure detector 22 and an auto-white balance detector 23, delineated within broken lines. Each of these detectors now is described in greater detail.

AUTO-FOCUS DETECTOR 21

Digital circuits may be used to implement the auto-focus detector 21 in the embodiment of this invention illustrated in FIG. 4. Alternatively, the auto-focus detector may be implemented by suitable programming of a microprocessor, as will become apparent from the following description.

In the illustrated embodiment wherein the auto-focus detector 21 is implemented by digital circuits, the detector 21 is generally comprised of digital filters which are further described below and are adapted to filter intermediate and higher frequency components from a video signal, selector circuits adapted to select different filtering characteristics from the digital filters as lens group F4 is adjusted to its just-focused position, coring circuits adapted to reject noise signals from the filtered intermediate and higher frequency components, gate circuits adapted to limit the filtered higher frequency components to discrete auto-focus areas of the imaged picture, peak detectors adapted to detect the peaks of the intermediate and higher frequency components derived by the digital filters, and integrators adapted to integrate the detected peaks.

As shown more particularly in FIG. 4, an input terminal 31 receives a digitized composite video signal, as may be produced by the A/D converter 9 of FIG. 1. A luminance separator 32 and a chrominance separator 33 are coupled to input terminal 31 to separate a luminance component Y and chrominance component $C_R$ and $C_B$ from the digitized composite video signal. In the preferred embodiment, an auto-focus signal which represents the focus condition of lens system 1 is derived from the separated luminance component Y. Such auto-focus signal is produced from the luminance component Y in a discrete area of the video picture being imaged. This discrete area is established by an auto-focus area setting circuit 24 which establishes the focus detection area in which intermediate and higher frequency components of the luminance signal are examined. The focus detection area is established by system controller 12 which supplies a suitable control signal to auto-focus area setting circuit 24 by way of a serial input port 28. For example, since the complementary colored checkerboard array of pixel elements shown in FIG. 3 is scanned pixel by pixel and line by line, the auto-focus area setting circuit determines when particular pixels included in the focus setting area are scanned. When those pixels are scanned, as may be suitably established by timing control included in system controller 12, an auto-focus area enabling signal is produced. This enabling signal is used as a gating signal, as will be hereinafter described.

Figure 11A:
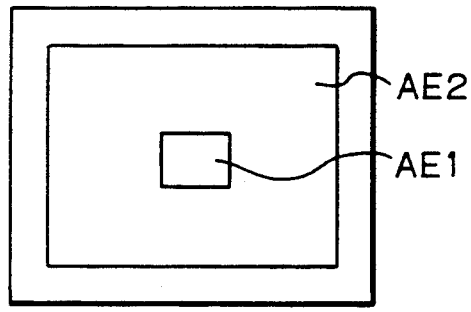
FIGS. 11A and 11B represent predetermined focus detection areas of the picture derived from the video camera of FIG. 1.
Figure 11B:
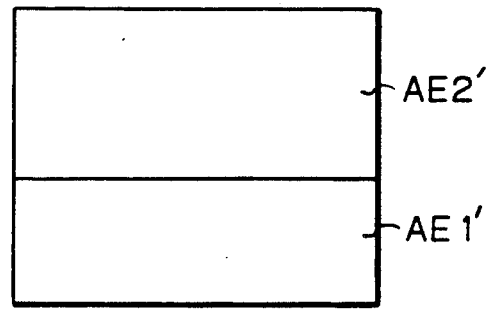

Preferably, system controller 12 controls auto-focus area setting circuit 24 to establish two or more focus detection areas. In an embodiment specifically disclosed herein, one focus detection area is a relatively small discrete area AE1 included within a larger discrete area AE2, as shown in FIG. 11A. Alternatively, the two discrete focus detection areas may be as illustrated in FIG. 11B, wherein the two areas AE'1 and AE'2 extend laterally across the image and are of substantially equal dimensions, with one area being disposed vertically above the other. It will be appreciated that other focus detection areas may be used and that, if desired, three, four or more focus detection areas may be provided.

Auto-focus area setting circuit 24 has an output thereof supplied to a selector 30 to which outputs from an auto-exposure area setting circuit 25, an automatic white balance area setting circuit 26 and a display area setting circuit 27 also are supplied. The selector 30 is controlled by system controller 12 through the serial input part 28 to couple one of the outputs supplied thereto to an output terminal 47. As a result of the selected area setting output signal, a camera viewfinder (not shown) may display a corresponding area outline. The user of the camera thus may observe the focus detection area which is used by the auto-focus detector 21 to produce the focus detection signal. Similarly, the exposure detection area produced by circuit 25, the white balance detection area produced by circuit 26 or the display area produced by circuit 27 may be observed. The video camera may be provided with suitable manual controls (not shown) for causing the system controller 12 to select a desired one of these detection areas for display.

The manner in which the luminance and chrominance components are separated from the digitized pixels produced by scanning the checkerboard pattern shown in FIG. 3 will now be described. As mentioned previously, the checkerboard pattern is scanned so that successive vertical pairs of pixel elements are read. This successive scanning of pixel pairs produces the signal shown in FIG. 5A when rows L1 and L2 are scanned, and produces the signal shown in FIG. 5B when rows L1 and L3 are scanned. As shown in FIG. 5A, when pixel element Cy in row L1 is scanned concurrently with pixel element G in row L2, the resultant digitized pixel corresponds to a sum signal (Cy+G). When the next adjacent pixel element Ye of row L1 is scanned concurrently with the next adjacent pixel element M of row L2, the sum signal (Ye+M) is produced. FIG. 5A represents the summed pixels which are produced as successive pixel pairs in rows L1 and L2 are scanned.

Similarly, when rows L1 and L3 are scanned concurrently, the scanning of pixel element Cy in row L1 with pixel element M in row L3 results in the sum signal (Cy+M). Likewise, when pixel element Ye in row L1 is scanned concurrently with pixel element G in row L3, the sum signal (Ye +G) is produced. FIG. 5B represents the successive summed signals produced when pixel pairs in rows L1 and L3 are scanned in succession.

Chrominance separator 33 operates to subtract successive summed signals produced by the row-by-row scanning of the checkerboard array shown in FIG. 3. In particular, when the summed signal shown in FIG. 5A is produced, the digital sample (Cy+G) is subtracted from the digital sample (Ye+M). It is to be appreciated that a yellow signal is formed by adding red and green signals (Ye=R+G), a magenta signal is formed by adding red and blue signals (M=R+B) and a cyan signal is produced by adding blue and green signals (Cy=B+G). Therefore, the subtracting operation carried out by chrominance separator 33 when the summed signals of FIG. 5A are produced may be expressed as follows:

$$(Ye + M) - (Cy + G) = [(R + G) + (R + B)] - [(B + G) + G]$$
$$= 2R - G = C_R$$

Similarly, the subtracting operation carried out by chrominance separator 33 when the summed signals represented by FIG. 5B are produced may be expressed as follows:

$$(Ye + G) - (Cy + M) = [(R + G) + G] - [(B + G) + (R + B)]$$
$$= -2B + G = -C_B$$

Thus, chrominance separator 33 separates the chrominance components $C_R$ and $C_B$ from the digitized video signal supplied to input terminal 31 from A/D converter 9.

Luminance separator 32 operates by summing two successive digitized samples produced by the A/D converter. For example, when the samples shown in FIG. 5A are produced, the luminance separator 32 operates to sum these samples as follows:

$$(Ye + M) + (Cy + G) = [(R + G) + (R + B)] + [(B + G) + G]$$
$$= 3G + 2R + 2B = Y$$

Likewise, the luminance separator 32 operates to sum every two samples of the signal represented by FIG. 5B, as follows:

$$(Y_e + G) + (C_y + M) = [(R + G) + G] +$$
$$[(B + G) + (R + B)]$$
$$= 3G + 2R + 2B = Y$$

In addition to separating the luminance and chrominance components as discussed above, separator circuits 32 and 33 convert the sampling frequency at which the digitized luminance and chrominance components are produced. For example, if the checkerboard pattern of FIG. 3 is comprised of 510 pixel elements in each row, the sampling frequency is converted from $(8/3)f_{SC}$ to a re-clocked rate of $2f_{SC}$. Alternatively, if the checkerboard pattern is comprised of 760 pixel elements in a row, the sampling frequency is converted from $4f_{SC}$ to $2f_{SC}$. The thus separated, digitized luminance signal is supplied from luminance separator 32 to the auto-focus detector 21 and also to the auto-exposure detector 22 and the auto-white balance detector 23. The separated chrominance components produced by chrominance separator 33 are supplied to the automatic white balance detector 23.

Returning now to the auto-focus detector 21 of FIG. 4, it will be seen that the digitized luminance signal Y is supplied to digital filters which serve to separate intermediate and higher frequency components from the luminance signal. As mentioned above, when lens group F4 is disposed at its just-focused position, sharp transitions are provided in the luminance signal, resulting in relatively high amplitudes of intermediate and higher frequency components (for example, frequencies which exceed 1 MHz and, preferably, those which exceed 500 KHz). The focus condition of the lens may be determined by detecting the amplitude of these intermediate and higher frequency components. For simplification, the expression "higher frequency components" is used hereafter to refer to both the intermediate and higher frequencies.

The digital filters receiving the digitized luminance signal Y are comprised of a delay circuit 34, conventional filter processors or computers 35, 36 and 37 and a high pass filter circuit 38. Delay circuit 34 may be a conventional digital delay line, such as may be formed by cascaded CCD's. Each filter processor or computer 35, 36 or 37 is coupled to respective outputs, or taps, of delay circuit 34, and each filter processor or computer is comprised of a summation circuit supplied with individually weighted outputs that are tapped from the delay circuit 34. By establishing different weighting coefficients coupled to different delay line taps, each of the conventional filter processors exhibits different filtering characteristics. Examples of the individual filtering characteristics of filter processors 35, 36 and 37 are graphically illustrated at 35a, 36a, and 37a. respectively, on FIG. 6. FIG. 6 also graphically represents at 38a an example of the filtering characteristic of the high pass filter 38. It is seen that the cut-off frequencies of filters 35, 36, 37 and 38 increase successively, as shown in FIG. 6.

As mentioned previously, the amplitude, or level, of the higher frequency components included in luminance signal Y is at a maximum when lens group F4 is at its just-focused position, and this amplitude, or level, decreases as the lens moves from that position to increase the extent to which it is unfocused. Accordingly, a relationship may be established between the position of lens group F4 and the amplitude or level of the filtered signals derived from filter processors 35, 36 and 37 and high pass filter 38. This relationship is graphically illustrated in FIG. 7, and it is seen therefrom that the spectral characteristics 35', 36', 37' and 38' of filter processors 35, 36 and 37 and high-pass filter 38, respectively, tend to become "sharper", or more narrowly defined, from filter processor 35 to high pass filter 38. These different filter characteristics are used by auto-focus detector 21 to produce a focus detection signal which may be used to drive lens group F4 accurately and quickly to its just-focused position.

Selector circuits 39A, 39B, 39C and 39D, which may be comprised of suitable digital switches, are controlled by a selection signal produced by system controller 12 and supplied to the selector circuits 39A-39D through serial input port 28. In the illustrated example, each selector circuit includes three inputs a, b and c, any one of which may be selected to be connected to the output thereof. Inputs a, b and c of selector circuits 39A and 39B are coupled to the outputs of filter processors 35, 36 and 37, respectively. Inputs a, b and c of selector circuits 39C and 39D are coupled to the outputs of filter processors 36 and 37 and of high pass filter 38, respectively. Thus, depending upon the operation of the selector circuits 39A-39D, a particular filter characteristic may be selected to pass the higher frequency components of the digitized luminance signal Y.

Coring circuits 40A, 40B, 40C and 40D are coupled to selector circuits 39A, 39B, 39C and 39D, respectively. In the preferred embodiment, each of the coring circuits 40A-40D is comprised of a threshold detector adapted to detect when the amplitude or level of the higher frequency component supplied thereto from the respective one of the selector circuits 39A-39D exceeds a minimum threshold level. That minimum threshold level is determined for the coring circuits 40A-40D by a suitable control signal supplied thereto from the system controller 12 through the serial input port 28. In the preferred embodiment, this minimum threshold level is approximately equal to the expected noise signal level included in luminance signal Y when the video camera images a scene with relatively little contrast changes therein.

Figure 8A:
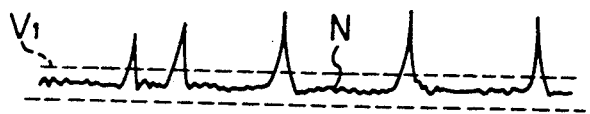
FIGS. 8A and 8B are waveform diagrams which are useful in understanding one aspect of the present invention.
Figure 8B:
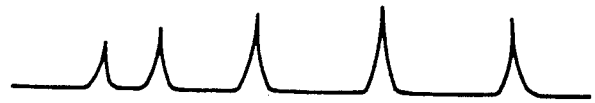

The function of coring circuits 40A-40D will best be appreciated by referring to the waveform diagrams of FIGS. 8A and 8B. When the video camera images a scene having relatively low contrast, such as a scene that appears as a relatively simple pattern, the noise signal N which passes through the digital filters 35 may be erroneously detected as a higher frequency component of the luminance signal. As a result, such erroneous detection of the noise signal N may produce a focus detection signal which will be used by system controller 12 to perform an erroneous focus operation. However, by detecting only those signal levels which exceed a threshold above the expected noise signal level N, such as those signal levels which exceed threshold $V_1$ shown in FIG. 8A, erroneous detection of the noise signal level is substantially avoided. Coring circuits 40A-40D are supplied with threshold level $V_1$ and thereby detect only the signal levels of the higher frequency components which exceed the level $V_1$. Consequently, noise signals are rejected and substantially only true signal levels of the higher frequency components pass through the coring circuits, as shown in FIG. 8B.

In one embodiment, each of the coring circuits 40A-40D is implemented by a subtractor which subtracts the threshold level $V_1$ from the signal supplied from the respective one of the digital filters. If the threshold level $V_1$ exceeds the signal level from which it is subtracted, the respective coring circuit produces a substantially zero output. Thus, only those higher frequency components which exceed the threshold level pass through the coring circuits 40A-40D.

Preferably, threshold level $V_1$ is changed automatically as a function of the intensity of the total light level picked up by imaging device 2. Alternatively, this threshold level $V_1$ may be changed manually, as desired.

The outputs of coring circuits 40A, 40B, 40C and 40D are selectively supplied through gate circuits 41A, 41B, 41C and 41D and switch circuits 42A, 42B, 42C and 42D to peak detectors 43A, 43B, 43C and 43D, respectively. The gate circuits 41A-41D are supplied with gate enabling signals produced by auto-focus area setting circuit 24 to pass only those higher frequency components produced from the pixel elements of the checkerboard pattern that are disposed within the auto-focus area established by setting circuit 24. In a preferred embodiment, gate circuits 41A and 41B are enabled, or opened, to pass the higher frequency components produced when scanning within larger focus detection area AE2 shown in FIG. 11A, and gate circuits 41C and 41D are enabled to pass the higher frequency components produced from the pixel elements disposed within the smaller focus detection area AE1. As will be described, gate circuits 41A and 41B are used when the lens is relatively far from its just-focused position, and gate circuits 41C and 41D are used when the lens is proximate to its just-focused position.

Gate circuits 41A-41D are further controlled to respond to a gate inhibit signal generated by auto-focus area setting circuit 24 when the level of the luminance signal Y produced by imaging device 2 is too high. As mentioned above, if the scene being imaged by the video camera contains a portion with a very high brightness level, higher frequency components derived from the bright luminance signal may exhibit an excessively high amplitude. However, this high amplitude is due to discrete overly bright areas and not to sharp transitions in the luminance signal that otherwise are present when the lens is at its just-focused position. Consequently, if this high amplitude in the higher frequency components of the luminance signal due to overly bright discrete areas is not blocked, errors will be made in the auto-focusing operation.

To prevent such errors, auto-focus area setting circuit 24 supplies a gate inhibit signal to gate circuits 41A-41D in the event that the luminance signal Y exceeds a maximum threshold. A luminance or brightness detector 46 is coupled to the luminance separator 32 to sense when the magnitude of the luminance signal exceeds a predetermined maximum threshold $V_2$. Hence, the gate circuits 41A-41D are disabled or inhibited for the time period that the luminance signal exceeds this maximum threshold $V_2$.

Figure 9A:
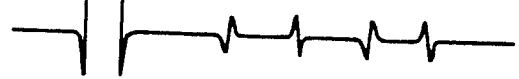
Figure 9B:
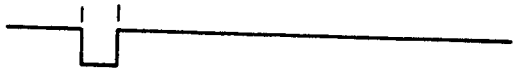

The function and advantages of the luminance detector 46 will be more specifically described with reference to the waveform diagrams shown in FIGS. 9A-9D. FIG. 9A represents the luminance component produced by imaging device 2 and, although analog signal levels are depicted, it will be appreciated that, in actuality, the signal levels are represented in digital form. FIG. 9A illustrates an example in which the level of the luminance signal exceeds the maximum threshold $V_2$ during the time T, as will occur when the imaging device images a scene having a very high brightness level, such as a scene that contains an object of high reflectivity, a bright light source, or the like. FIG. 9B represents the higher frequency components of the luminance signal of FIG. 9 that pass through one of the digital filters 35, 36, 37 and 38. It will be appreciated that the amplitude of the higher frequency components produced when the luminance signal Y exceeds maximum threshold $V_2$ is quite high and may provide false indications of the focus condition of the lens.

Figure 9D:
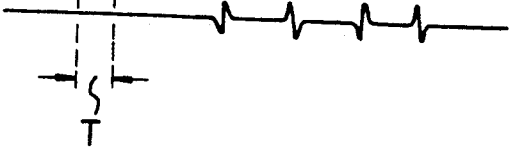

As shown in FIG. 9C, luminance detector 46 generates an inhibit or masking signal of a duration equal to the time T during which the luminance signal Y exceeds threshold $V_2$. This masking signal is supplied to auto-focus area setting circuit 24 which responds thereto to generate a gate inhibit signal by which gate circuits 41A-41D are closed, or inhibited, during this interval; whereby the false higher amplitude components caused by the excessive brightness level in the luminance signal do not pass through the gate circuits. This selective operation of the gate circuits is illustrated in FIG. 9D, wherein the gate circuits are inhibited during interval T, that is, the interval during which the luminance signal Y exceeds the maximum threshold $V_2$. Consequently, only the higher frequency components having non-excessive signal levels that are received from the coring circuits 40A-40D are passed by the gate circuits 41A-41D.

Alternatively, luminance detector 46 may function to sense when the luminance signal Y exceeds maximum threshold $V_2$ and then subtract this luminance signal level from the luminance signal itself, thereby cancelling the excess brightness, whereupon, this "corrected" luminance signal may be supplied to the digital filters for obtaining the higher frequency components.

Peak detector circuits 43A, 43B, 43C and 43D are coupled to gate circuits 41A, 41B, 41C and 41D by switching circuits 42A, 42B, 42C and 42D, respectively. The switching circuits 42A-42D are selectively controlled by system controller 12 which applies suitable switch control signals thereto through serial input port 28.

Each peak detector circuit, although formed as a digital circuit, operates to detect the peak level (that is, the maximum level) in the signal supplied through the switching circuit connected thereto. In one embodiment, each switching circuit, such as, switching circuit 42A, couples the output of the respective gate circuit 41A to peak detector circuit 43A for the duration of a video line interval, whereafter the switching circuit 42A is opened and the peak detector circuit 43A is reset. In this mode of operation, the peak level of the higher frequency components included in the luminance signal Y during each video line interval is detected.

Alternatively, each switching circuit, for example, switching circuit 42A may be closed for an entire vertical field interval. In that event, the respective peak detector circuit 43A detects the peak (or maximum) level in the higher frequency components included in the luminance signal that is produced during a video field. At the end of a field interval, switching circuit 42A is opened and peak detector circuit 43 is reset in preparation to detect the peak level included in the next field interval.

Each switching circuit, such as switching circuit 42A, also is operable to bypass peak detector circuit 43A so as to pass all peaks included in the higher frequency components provided at the output of the respective coring circuit 40A and gate circuit 41A (rather than passing only the maximum peak level included in the higher frequency component).

Integrator circuits 45A, 45B, 45C and 45D are coupled to peak detector circuits 43A, 43B, 43C and 43D by switching circuits 44A, 44B, 44C and 44D, respectively. The switching circuits 44A-44D are controlled by system controller 12 which supplies a control signal thereto through serial input port 28. Each of the switching circuits 44A-44D selectively exhibits a first state in which the output of the respective one of the peak detector circuits 43A-43D is coupled to a respective one of the integrator circuits 45A-45D, and a second state in which the respective one of the integrator circuits 45A-45D is bypassed. Each of the integrator circuits 45A-45D is adapted to sum the peaks supplied by the respective one of the peak detector circuits 43A-43D connected thereto. In one embodiment, the peak (or maximum) level sensed by, for example, peak detector circuit 43A in each line of a field interval is summed by integrator circuit 45A to produce a focus detection signal whose magnitude is dependent upon (and, thus, is indicative of) the focus condition of the lens. In another embodiment, integrator circuit 45A is supplied with the peak, or maximum, level sensed by peak detector circuit 43A in a vertical field interval. The integrator circuit 45A then sums the detected peaks that are sensed in a predetermined number of field intervals, such as the peaks that are detected in four successive field intervals. This too provides a focus detection signal whose magnitude is dependent upon the level of the higher frequency components included in the luminance signal which, in turn, is a function of the focus condition of the lens.

In the mode of operation of switching circuit 42A for bypassing peak detector circuit 43A, there are supplied to integrator circuit 45A those higher frequency components which exceed threshold $V_1$ established by coring circuit 40A. In that case, integrator circuit 45A sums a number of peak levels included in a field interval, provided those peak levels exceed the threshold $V_1$.

Figure 10:
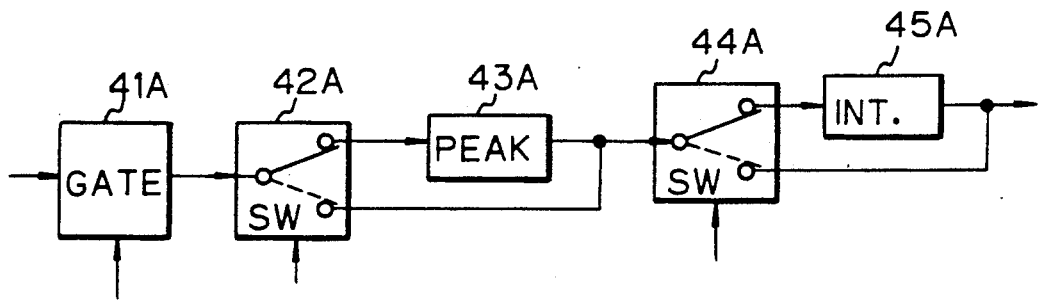
FIG. 10 is a partial block, partial schematic diagram of a portion of the optical detector shown in FIG. 4.

The foregoing alternative operating modes of peak detector circuit 43A and integrator circuit 45A will best be appreciated by referring to FIG. 10 which is a part schematic, part block diagram of these circuits shown interconnected by switching circuits 42A and 44A which are illustrated as two-position switches. In its first position shown in full lines, switching circuit 42A couples the output of gate 41A to peak detector circuit 43A, and in its second position shown in dotted lines the switching circuit 42A bypasses the peak detector circuit 43A. Similarly, switching circuit 44A is changeable between a first position shown in full lines for coupling the output of peak detector circuit 43A to integrator circuit 45A, and a second position shown in dotted lines to bypass the integrator circuit 45A. Switching circuits 42A and 44A are operable by switch control signals supplied thereto through the serial input port 28 from the system controller 12 so as to establish the following modes:

(a) Both switching circuits 42A and 44A assume their first positions, as shown in full lines, and peak detector circuit 43A is suitably reset at the end of each line interval, whereupon peak detector circuit 43A detects the peak (or maximum) level in the higher frequency components included in the luminance signal during each video line interval. Integrator circuit 45A sums the peak level detected in each line interval over a field duration.

(b) Switching circuit 42A assumes its first or full-line position and switching circuit 44A assumes its second position shown in dotted lines, whereupon peak detector circuit 43A, which is reset at the end of each field interval, senses the peak level in a field interval, and integrator circuit 45A is bypassed. Hence, the detected peak level is not summed (or integrated) with other peak levels. It will be appreciated that the thus detected peak level in a field interval is an indication of the focus condition of the lens.

(c) Switching circuit 24A assumes its second or dotted-line position while switching circuit 44A assumes its first or full-line position, whereupon all signal levels, including peaks, of the higher frequency components included in the luminance signal Y which exceed the threshold level $V_1$ established by coring circuit 40A are integrated over a field interval.

(d) Both switching circuits 42A and 44A assume their first or full-line positions, and peak detector circuit 43A is reset at the end of each field interval. In this mode, the peak detector circuit 43A detects the peak (or maximum) signal level in the higher frequency components over a video field interval, while the integrator circuit 45A is made to sum the detected peak levels for a predetermined number of fields, for example, the peak level in each of four successive fields, to produce the focus detection signal. In this mode of operation, the focus detection signal varies relatively slowly as compared to the other operating modes discussed above.

Although only the switching circuits 42A and 44A and their association with the peak detector circuit 43 and integrator circuit 45A have been shown in FIG. 1 and described specifically above, it will be understood that the switching circuits 42B, 42C and 42D and 44B, 44C and 44D are similarly associated with the peak detector circuits 43B, 43C and 43D and integrator circuits 45B, 45C and 45D, respectively.

The signals provided at the outputs of integrator circuits 45A-45D comprise focus detection signals having magnitudes to which the focus condition of lens group F4 is related. Such focus detection signals are supplied by way of serial output port 29 to the system controller 12, which, on the basis thereof, produces a focus control signal supplied by way of driver 13 to focus motor 3 in FIG. 1.

The manner in which a focusing operation is carried out will now be described. Initially, let it be assumed that lens group F4 is at an out-of-focus position, for example, at a position indicated at i in FIG. 7. System controller 12 initially controls selector circuits 39A and 39B so as to select the filtering characteristics exhibited by filter processor or computer 35, and thereby derive the higher frequency components in the luminance signal. The selected higher frequency components are applied to gates 41A and 41B through coring circuits 40A and 40B which provide noise rejection in the manner discussed above and shown in FIGS. 8A and 8B. Hence, the coring circuits 40A and 40B detect signal levels of the higher frequency components which exceed the threshold $V_1$ and supply the detected signals to gates 41A and 41B, respectively.

In this initial condition, auto-focus area setting circuit 24 is controlled by system controller 12 to generate a gate enable signal corresponding to the auto-focus area $AE_2$, shown in FIG. 11A. Accordingly, the detected signal produced by coring circuit 40A is gated to peak detector circuit 43A when the pixel elements of imaging device 2 which are included within auto-focus area $AE_2$ are being scanned. Let it be assumed that peak detector circuit 43A detects the peak (or maximum) level of the detected signal during each video line interval. The detected peaks in those line intervals which are disposed within auto-focus area $AE_2$ are summed in integrator circuit 45A to produce a focus detection signal.

Coring circuit 40B, gate 41B, peak detector circuit 43B and integrator circuit 45B operate in the same way as just described. Hence, integrator circuit 45B produces a focus detection signal similar to that produced by integrator circuit 45A. Both of these focus detection signals are supplied serially to system controller 12. At this time, the signals that may be produced by integrator circuits 45C and 45D are ignored and, preferably, are not supplied to or utilized by the system controller.

In the preferred embodiment, the focus detection signal produced by one of a pair of integrator circuits, such as the focus detection signal produced by integrator circuit 45A, is used as a measure of the focus condition of the lens. The other focus detection signal, for example, the focus detection signal produced by integrator circuit 45B, is used by the system controller 12 to determine when a filter processor having sharper filtering characteristics should be selected. For example, as the lens group F4 is driven toward its just-focused position, the magnitude of the focus detection signal derived by integrator circuit 45B for filter processor 35 changes at a rate which diminishes as the lens approaches its just-focused position. This diminished rate of change is attributed to the decrease in slope of the spectral characteristic 35' of filter processor 35, as illustrated in FIG. 7.

When the lens group F4 reaches position ii (shown in FIG. 7), the sensed decrease in the rate of change of the focus detection signal derived by the integrator circuit 45B from the output of filter processor 35, and which is represented by the slope of curve 35', causes the system controller 12 to operate selector circuits 39A and 39B for selecting filter processor 36 (having a narrower filter characteristic 36' on FIG. 7) for passing the higher frequency components included in the luminance signal Y. Coring circuits 40A and 40B now detect the signal levels of the higher frequency components supplied thereto from filter processor 36, and produce detected signals when these signal levels exceed threshold $V_1$. Thus, even though different filtering characteristics are selected for deriving the higher frequency components of the luminance signal, noise rejection nevertheless is carried out by the coring circuits 40A and 40B. Gates 41A and 41B continue to gate the detected signals during the interval corresponding to auto-focus area $AE_2$, and peak detector circuits 43A and 43B detect the peak level in each video line. Integrator circuits 45A and 45B sum the peak signal in each line over a field interval to produce the focus detection signals. As before, the focus detection signal provided by integrator circuit 45A is used as a measure of the focus condition of the lens, and the focus detection signal provided by integrator circuit 45B is used by the system controller to determine when the filter characteristics should be changed over to a narrower characteristic. Once again, a determination to change over to a narrower filter characteristic is made when the rate of change of the focus detection signal decreases.

Let it now be assumed that, when the focus lens reaches position iii (shown in FIG. 7), the focus detection signal derived from filter processor 36 increases at a slower rate, as represented by the slope of curve 36' at 36iii. The system controller 12 responds thereto by selecting filter processor 37, having the spectral characteristic curve 37' illustrated in FIG. 7, to derive the higher frequency components from the luminance signal Y. More specifically, selector circuits 39A and 39B now are changed over to couple the output of filter processor 37 to the respective coring, gate, peak detector and integrator circuits. These circuits operate in the manner described above to produce the focus detection signals.

Selector circuits 39A and 39B, coring circuits 40A and 40B, gate circuits 41A and 41B, peak detector circuits 43A and 43B and integrator circuits 45A and 45B are used to produce focus detection signals during scanning of the pixel elements within auto-focus area $AE_2$. Selector circuits 39C and 39D, coring circuits 40C and 40D, gate circuits 41C and 41D, peak detector circuits 43C and 43D and integrator circuits 45C and 45D are used to produce the focus detection signals during scanning of the pixel elements within auto-focus area AE . In one embodiment, auto-focus area setting circuit 24 supplies gate enable signals to at least gate circuits 41A and 41B to define auto-focus area $AE_2$ for a predetermined time. It is appreciated from the foregoing discussion that during this time, the focusing lens is driven toward its just-focused position. At the expiration of this predetermined time, the auto-focus area setting circuit supplies gate enable signals to at least gate circuits 41C and 41D to define auto-focus area $AE_1$ (FIG. 11A). When focus detection signals are derived from the higher frequency components of the luminance signal produced in response to scanning of the pixel elements within auto-focus area AE1, the outputs of integrator circuits 45A and 45B may be ignored and, if desired, need not even be supplied to system controller 12 through serial output port 29. Alternatively, if these focus detection signals are supplied to the system controller 12, they are not used thereby.

Selector circuits 39C and 39D are each connected to filter processors 36 and 37 and also to high pass filter 38 and, under the control of system controller 12, they select the spectral characteristics of any one of these filtering circuits in the same manner as selector circuits 39A and 39B select the spectral characteristic of filter processor 35, 36 or 37. For example, let it be assumed that the predetermined time interval, in which the auto-focus area $AE_2$ is defined or being scanned, expires shortly after the focusing lens group F4 reaches position iii on FIG. 7, at which point filter processor 37 was selected by selector circuits 39A and 39B to derive the higher frequency components of the luminance signal. System controller 12 now selects selectors 39C and 39D, together with the circuits connected in cascade therewith, to produce the focus detection signals. Selectors 39C and 39D are controlled to select filter processor 37 for deriving the higher frequency components. Coring circuits 40C and 40D detect signal levels of these higher frequency components which exceed the threshold $V_1$, and gate circuits 41C and 41D gate the detected signals produced by the coring circuits to peak detector circuits 43C and 43D during scanning of pixel elements within auto-focus area $AE_1$. Peak detector circuits 43C and 43D detect the peak (or maximum) level in the gated, detected signal during each video line interval, and integrator circuits 45C and 45D sum the detected peaks in the line intervals disposed within auto-focus area $AE_1$. Hence, integrator circuits 45C and 45D produce focus detection signals in the same manner as discussed above in conjunction with integrator circuits 45A and 45B.

As the focusing lens group F4 continues to advance toward its just-focused position, system controller 12 changes over selector circuits 39C and 39D when the lens arrives at, for example, position iv (shown in FIG. 7). More specifically, the system controller 12 senses that the rate of change of the focus detection signal produced by integrator circuit 45D has decreased and, in response thereto, changes over selector circuits 39C and 39D to select the narrowest spectral characteristic 38' which, in this embodiment, is exhibited by high pass filter 38.

The foregoing operation is repeated and, when the focus detection signal produced by integrator circuit 45C attains a predetermined level, system controller 12 determines that the focusing lens has reached its just-focused position. Accordingly, focus drive motor 3 (FIG. 1) is stopped.

Alternatively, system controller 12 may sense when the focus detection signal produced by integrator circuit 45C reaches its peak level (rather than reaching a predetermined level), whereupon the focus drive motor 3 is stopped.

As mentioned above, in order to prevent spurious signal levels which may be present erroneously in the detected signal produced by the coring circuits due to very high brightness levels in the luminance signal Y, gate circuits 41A–41D are disabled during those periods that such excessive brightness levels are present. More specifically, luminance detector 46 controls auto-focus area setting circuit 24 to produce a gate inhibit signal when excessive brightness levels are sensed, as discussed above in conjunction with FIGS. 9A-9D. Thus, integrator circuits 45A-45D function to integrate the detected peaks produced by peak detector circuits 43A-43D, except during those intervals when the luminance signal exceeds threshold $V_2$.

In the embodiment just described, the higher frequency components derived from selector circuits 39A and 39B are used to produce the focus detection signals for a predetermined time, for example, during scanning of pixel elements in the auto-focus area $AE_2$, whereafter the higher frequency components derived by selector circuits 39C and 39D are used to produce the focus detection signals during scanning o pixel elements within auto-focus area $AE_1$. Alternatively, selector circuits 39A and 39B may be selected to derive the higher frequency components within auto-focus area $AE_2$ until the rate of change of the focus detection signal produced by integrator circuit 45B is too slow (even after filter processors with narrower spectral characteristics have been selected by selector circuits 39A and 39B). Thereafter, selector circuits 39C and 39D are selected for deriving the higher frequency components from which the focus detection signals while scanning pixel elements within auto-focus area $AE_1$ are produced. Other techniques may be used to change over from one auto-focus area to another and, accordingly, to change over from one set of selector circuits to another.

In the embodiment described above, selector circuits 39A and 39B are controlled to select the same filtering characteristics provided by the digital filter and, similarly, selector circuits 39C and 39D also are controlled to select the same filtering characteristics. Alternatively, selector circuit 39A may be controlled to select a filter characteristic having broader (or wider) spectral characteristics than the filter characteristic selected by selector circuit 39B. Likewise, selector circuit 39C may be controlled to select a frequency characteristic having broader spectral characteristics than the filter characteristic selected by selector circuit 39D. For example, when the focusing lens is at position i (shown in FIG. 7), selector circuit 39A may select the filtering characteristics exhibited by filter processor 35 and represented by the curve 35', whereas selector circuit 39B selects the filtering characteristic exhibited by filter processor 36 and represented by the curve 36'. Hence, the focus detection signal produced by integrator circuit 45A is derived from filter processor 35 and the focus detection signal produced by integrator circuit 45B is derived from filter processor 36. As before, when system controller 12 senses that the rate of change of the focus detection signal produced by integrator circuit 45B from the higher frequency components passed by filter processor 36 is too slow, control signals are supplied from the system controller 12 through input port 28 to selector circuits 39A and 39B so that selector circuit 39A now selects the filtering characteristics exhibited by filter processor 36 and selector circuit 39B now selects the filtering characteristics exhibited by filter processor 37. The foregoing operation then is repeated until, once again, the system controller 12 senses that the rate of change of the focus detection signal produced by integrator circuit 45B is too slow. At that time, selector circuit 39A is changed over to select the filtering characteristics exhibited by filter processor 37.

Similarly, when the focus detection signals are derived from the higher frequency components in the luminance signal produced during scanning of pixel elements in the focus area $AE_1$, selector circuit 39C may be controlled to select the filtering characteristics exhibited by filter processor 36 while selector circuit 39B is controlled to select the filtering characteristics exhibited by filter processor 37. As before, when system controller 12 senses that the rate of change of the focus detection signal produced by integrator circuit 45D is too slow, selector circuit 39C may be changed over to select the filtering characteristics exhibited by filter processor 37 and selector circuit 39D is changed over to select the filtering characteristics exhibited by high pass filter 38. Further changeovers occur in the selection of the filtering characteristics as the focusing lens approaches its just-focused position, as described above.

In accordance with yet another alternative mode of operation, the selector circuits 39A-39D may be controlled so that each selects a respective predetermined filtering characteristic. For example, selector circuit 39A may select the filtering characteristic exhibited by filter processor 35, selector circuit 39B may select the filtering characteristic exhibited by filter processor 36, selector circuit 39C may select the filtering characteristic exhibited by filter processor 37 and selector circuit 39D may select the filtering characteristic exhibited by high pass filter 38. Assuming that the focusing lens group F4 is relatively distant from its just-focused position, the auto-focus area $AE_2$ is used and gates 41A and 41B are enabled at intervals corresponding to this auto-focus area. In such case, the focus detection signal from integrator circuit 45A is used by system controller 12 to determine the focus condition of the lens. The system controller 12 also senses the rate of change of this focus detection signal and, when that rate decreases, selector circuit 39B is actuated to select the higher frequency components derived from the luminance signal by filter processor 36. Now, the focus detection signal produced by integrator circuit 45B is used as an indication of the focus condition of the lens.

System controller 12 controls selector circuits 39C and 39D in a manner similar to that just described when the focus detection signal is derived from scanning of pixel elements in the auto-focus area $AE_1$.

In yet another operating mode, a pair of focus detection signals is used as a measure of the focus condition of the lens. For example, the focus detection signals produced by integrator circuits 45A and 45B are used in combination to sense the focus condition during scanning of pixel elements within auto-focus area $AE_2$, and the focus detection signals produced by integrator circuits 45C and 45D are used as a measure of the focus condition during scanning of pixel elements within the auto-focus area $AE_1$. By using a pair of focus detection signals, erroneous indications attributable to artifacts or interference in one of the focus detection signals are avoided. For the purposes of this example, it will be assumed that the focusing lens is distant from its just-focused position, and that selector circuit 39A is controlled to select the filtering characteristics exhibited by filter processor 35 while selector circuit 39B is controlled to select the filtering characteristics exhibited by filter processor 36. If an impulse or other interference is present on the focus detection signal produced by integrator circuit 45A, that interference could be erroneously interpreted by the system controller 12 as indicating that the focusing lens is much closer to its just-focused position than it is in fact. Responding to such false interpretation, the system controller may change over selector circuit 39A prematurely to select the filtering characteristics exhibited by filter processor 36 or even filter processor 37. Because of the narrow spectral characteristics exhibited by the prematurely selected filter processor, the amplitude of the focus detection signal derived therefrom may be too low for the system controller to determine the actual focus condition of the lens. However, since it is unlikely that similar interference will be also superimposed on the focus detection signal produced by integrator circuit 45B, the system controller 12 may compare the focus detection signals produced by integrator circuits 45A and 45B to conclude that the higher magnitude of one is not matched by the other and, thus, is artificial. Hence, the system controller 12 may discriminate artifacts, noise or interference superimposed onto a focus detection signal, and thereby avoid false indications of the lens focus condition.

From the foregoing it is to be appreciated that, by changing the filtering characteristics used to derive higher frequency components from the luminance signal produced by the video camera imaging device as the focusing lens is driven toward its just-focused position, the lens may be focused quickly and accurately. Optimum filtering characteristics are selected as the lens approaches its just-focused position. Moreover, coring circuits 40A–40D prevent erroneous focusing operations that may be attributed to noise signals which pass through the filter processors when a low contrast scene is being imaged. Also, focusing errors which otherwise may be due to the imaging of very bright areas are avoided by the brightness detector 46 cooperating with the auto focus area setting circuit 24 for causing the gate circuits 41A–41D to reject the higher frequency components having high amplitudes caused by such bright areas, whereby such higher frequency components having high amplitudes do not influence the focus detection signals produced by integrators 45A–45D.

AUTO-EXPOSURE DETECTOR 22

Auto-exposure control is effected by suitably opening and closing the iris 18 and by varying the gain of the AGC circuit 8 (FIG. 1) so that the level of the luminance signal from an exposure detection area of the CCD imaging device 2 may be maintained at a predetermined value.

Since the brightness level of the background of a scene which is back-lighted becomes very high, the overall luminance signal level is substantially elevated and, if the auto-exposure control is effected with reference to such overall luminance signal level, the aperture size of the iris 18 is decreased and a relatively low gain is established for the AGC circuit. By reason of the foregoing, the output of the video camera would cause objects in the foreground of the corresponding displayed image to appear dark and inconspicuous. On the other hand, when the scene is subjected to excessive lighting from in front (hereinafter referred to as excessive front-lighting), the brightness level of the background is low relative to the brightness of objects in the foreground and the overall luminance signal level is decreased so that, in response thereto, the iris is opened and the gain of the AGC circuit is increased with the result that the brightly illuminated objects in the foreground of the displayed image would be saturated.

Generally, in accordance with the present invention, the above problems encountered in effecting exposure control are avoided by dividing the image of a scene in the field of view of the video camera into a plurality of exposure detection areas whose positions and relative dimensions are controlled in accordance with lighting conditions, such as, normal front-lighting, back-lighting or excessive front lighting, so that at all times exposure control can be effected with reference to a luminance signal level detected for an exposure detection area which contains foreground objects for maintaining a predetermined luminance signal level in respect to such foreground objects.

Furthermore, if exposure control is effected with reference to an average of the luminance signal levels detected for a selected exposure detection area the detected luminance signal level will be undesirably low. For example, in the case of a standard signal, such as, a color bar, the average luminance signal level is approximately 30 percent of the peak level. As a result, if exposure control of a video camera is carried out with a control signal obtained by average-detecting the luminance signal, the entire display screen is liable to appear dark. Therefore, it is desirable to effect exposure control with reference to a detected luminance signal value that is closer to the peak value of the luminance signal levels in the exposure detection area than it is to the average of the luminance signal levels in such detection area.

Figure 16:
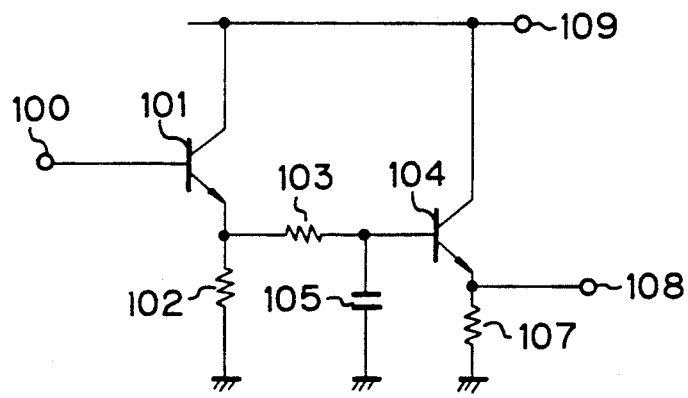
FIG. 16 is a circuit diagram of a prior art analog detection circuit used in connection with auto-exposure control.

As is shown in FIG. 16, an analog detector circuit has been conventionally provided for detection of the luminance signal level from the CCD imaging device. In such circuit the base of a transistor 101 is connected to an input terminal 100 which receives the luminance signal. The collector of the transistor 101 is connected to a power source terminal 109. A resistor 102 is connected between the emitter of transistor 101 and the ground. The emitter of the transistor 101 is also connected to one end of a resistor 103 which, at its other end, is connected to the base of a transistor 104 and, through a capacitor 105, to ground. The collector of transistor 104 is also connected to the power source terminal 109. A resistor 107 is connected between the emitter of the transistor 104 and ground, and an output terminal 108 extends from the emitter of the transistor 104. In operation of the circuit shown on FIG. 16, a luminance signal from the CCD imaging device is supplied through input terminal 100 to the base of the transistor 101 for detection by the latter, and a detection output from the transistor 101 is extracted at the output terminal 108 through the buffer composed of transistor 104.

In the case of the analog detector circuit shown on FIG. 16, either a characteristic near peak detection or a characteristic near average detection can be established, as desired, by suitably selecting the relationship between the charging time constant and the discharging time constant of the capacitor 105. More specifically, by decreasing the value of the resistor 103, which determines the charging time constant for the capacitor 105, and increasing the value of the resistor 102, which determines the discharging time constant, the characteristic of the detector circuit can be made to approach peak detection. On the other hand, by increasing the value of the resistor 103 and decreasing the value of the resistor 102, the characteristic can be made to approach average detection. Thus, for the described analog detector circuit, the detection characteristic can be readily established.

However, in the case of a digital exposure control circuit, the luminance signal from the CCD imaging device is digitized as in the A/D converter 9, and detection of the digital luminance signal level is performed by accumulating luminance signal data within a predetermined area and dividing it by a predetermined coefficient. The result of the foregoing is a perfect average detection output which, as earlier noted, is not desirable for auto-exposure control.

Therefore, in accordance with this invention, a digital luminance signal level detector circuit is provided with peak detector circuits for detecting peak values of the digital signal and average value detector circuits for detecting average values of the digital signal, and outputs of the peak detector circuits and outputs of the average value detector circuits are suitably weighted and added for desirably indicating a detected luminance signal level that can be advantageously used for auto-exposure control.

More specifically, as shown in FIG. 4, in the auto-exposure detector 22 according to an embodiment of this invention, the luminance component Y from luminance separator 32 is supplied to a so-called "knee" circuit 51 and to one input of a comparator 52. A comparison level signal, for example, of the level $V_3$ (FIG. 13B), is supplied to another input of the comparator 52 through the serial input port 28 from the system controller 12.

An output of the filter processor 37 is supplied to peak detector circuits 54A and 54B through gate circuits 53A and 53B, respectively. The output of the filter processor 37 which is supplied to gate circuits 53A and 53B is a luminance signal from which a high frequency range noise component has been removed by a low-pass filter. Thus, the noise component is removed from the luminance component supplied through gate circuits 53A and 53B to peak detector circuits 54A and 54B for accurate detection of the peaks therein. Since a digital high-pass filter based on a digital averaging low-pass filter is composed of the delay circuit 34 and the filter processor 37, both a high-pass filter output, for example, to be applied to the selector circuits 39A–39D, and a low-pass filter output, for example, to be applied to the gate circuits 53A and 53B, can be readily extracted from the filter processor 37.

Figure 17A:
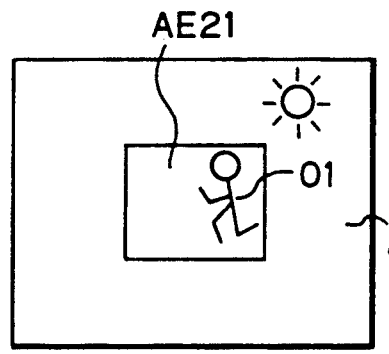
FIGS. 17A and 17B are diagrammatic views of exposure detection areas used in accordance with an embodiment of this invention during back-lighting and excessive front-lighting.
Figure 17B:
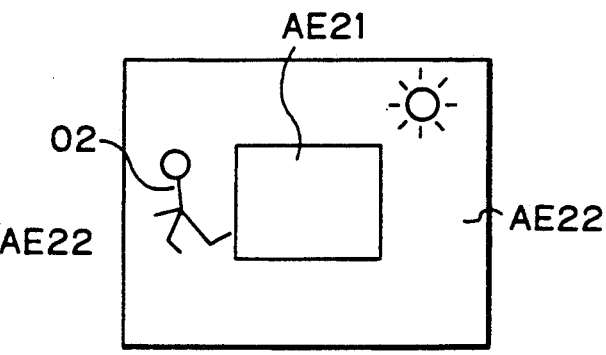

The gate circuits 53A and 53B are supplied with gate enabling signals supplied from the auto-exposure detection area setting circuit 25 under the control of the system controller 12 for selectively opening and closing the gate circuits 53A and 53B and thereby defining a plurality of exposure detection areas, for example, as at $AE_{21}$ and $AE_{22}$ on FIGS. 17A and 17B, or as at $AE'_{21}$ and $AE'_{22}$ on FIGS. 18A and 18B.

Figure 12:
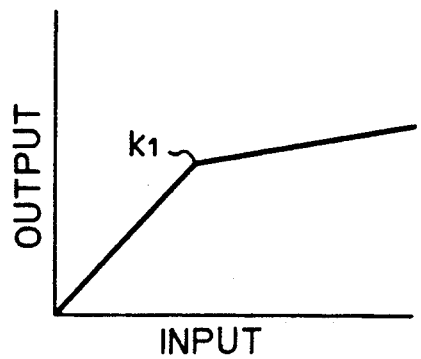
FIG. 12 is a graphical representation of the transfer characteristic of a circuit used for auto-exposure control in the optical detector of FIG. 4.
Figure 15A:
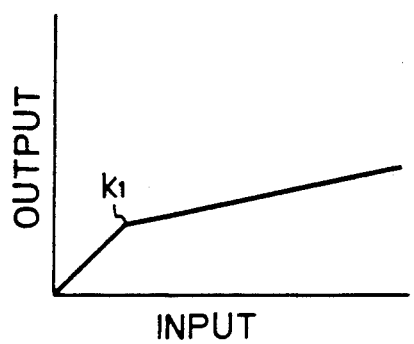
FIGS. 15A and 15B represent the manner in which the transfer characteristic shown in FIG. 12 may be varied for different image conditions.
Figure 15B:
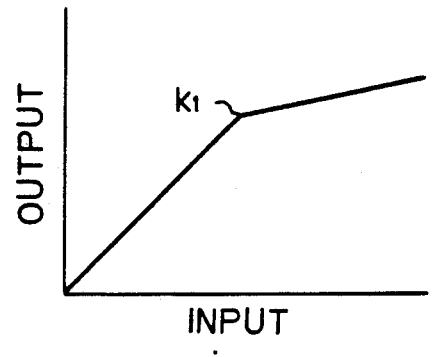

As is shown on FIG. 12, the knee circuit 51 has a nonlinear characteristic, that is, a characteristic comprised of two relatively straight portions with different slopes joined at the knee $k_1$. The output of the knee circuit 51 is supplied through gate circuits 55A and 55B to integrator circuits 56A and 56B, respectively. The gate circuits 55A and 55B are also supplied with a gate enabling signal from the auto-exposure detection area setting circuit 25 for defining the exposure detection areas $AE_{21}$ and $AE_{22}$ or $AE'_{21}$ and $AE'_{22}$. It will be apparent that the integrator circuits 56A and 56B detect averages of the luminance signal levels in the digital luminance component Y supplied to the integrator circuits 56A and 56B when the respective gate circuits 55A and 55B are open or enabled. In the absence of the knee circuit 51, if an average of the luminance signal level is detected by the integrator circuit 56A or 56B during the interval in which the respective gate circuit 55A or 55B is open, the averaged output may be increased by a high brightness occurring at even a relatively small area within the respective exposure detection area, with the result that the auto-exposure control causes the entire picture output by the video camera to have an undesirably dark appearance. However, by the presence of the knee circuit 51, the gain of the high brightness portion is decreased so that the averaged output is not unduly influenced thereby. A characteristic setting signal is supplied from the system controller 12 through the serial input port 28 to the knee circuit 51 for varying the turning point or knee $k_1$ of the characteristic curve thereof, for example, between the positions shown on FIGS. 15A and 15B, respectively.

The comparator 52 detects those samples of the digital luminance component Y from the luminance separator 32 which have levels above the comparison level $V_3$ supplied to the comparator 52 from the system controller 12 through the serial input port 28. The resulting comparison output of the comparator 52 is supplied through gate circuits 57A and 57B to distribution detectors 58A and 58B. The distribution detectors 58A and 58B count the numbers of samples of the digital luminance signal having levels above the predetermined brightness level $V_3$ during intervals when the gate circuits 57A and 57B are respectively enabled or open. The gate circuits 57A and 57B are provided with the gate enabling signals from the auto-exposure detection area setting circuit 25 for defining the exposure detection areas $AE_{21}$ and $AE_{22}$ or $AE'_{21}$ and $AE'_{22}$.

The distribution of the luminance signal levels over the scene in the field of view of the video camera can be determined from the outputs of the distribution detectors 58A and 58B. For example, when a picture or scene in the field of view of the video camera is back-lighted, as illustrated in FIG. 13A, high level luminance signal portions are distributed mostly over the background or peripheral portions of the picture, while relatively low level luminance signal portions, for example, corresponding to a back-lighted object in the foreground of the picture, are distributed mostly in the central portion thereof, as shown in FIG. 13B. Such distribution of the high-level luminance signal portions can be determined from the count value constituting the output H1 of the distribution detector 58A and indicating the number of samples having a luminance level above the predetermined level V3, for example, in the exposure detection area $AE_{21}$, and from the count value constituting the output H2 of the distribution detector 58B and which indicates the number of samples having luminance signal levels above the predetermined level V3, for example, in the exposure detection area $AE_2$. Such count values or outputs H1 and H2 from the distribution detectors 58A and 58B are supplied to the system controller 12 through the serial output port 29.

Outputs $P_1$ and $P_2$ representing luminance signal peak values for the selected exposure detection areas, such as the areas $AE_{21}$ and $AE_{22}$, are obtained from the peak detectors 54A and 54B, respectively, and are supplied through the serial output port 29 to the system controller 12. Similarly, outputs $IN_1$ and $IN_2$ representing the integrated values or averages of the luminance signal levels in the selected exposure detection areas, such as the areas $AE_{21}$ and $AE_{22}$, respectively, are obtained from the integrator circuits 56A and 56B, respectively, and are output through the port 29 to the system controller 12.

As earlier noted, if auto-exposure control is effected with reference only to an average of the detected luminance signal levels, for example, as obtained at the outputs $IN_1$, and $IN_2$ of integrator circuits 56A and 56B, the resulting exposure control is defective as the average detected level is undesirably low. Since desirable auto-exposure control is performed with reference to a detected luminance signal level which is nearer to the detected peak luminance signal level than to the average of the detected luminance signal levels, in a preferred embodiment of this invention, auto-exposure control is effected with reference to a detected luminance signal level which is obtained by appropriately mixing average and peak values as derived from the integrator circuits 56A and 56B and from the peak detectors 54A and 54B, respectively.

In order to effect such mixing, and as shown in the functional block diagram of FIG. 14, the peak values $P_1$ and $P_2$ output by the peak detector circuits 54A and 54B and the average or integrated values $IN_1$ and $IN_2$ output by the integrator circuits 56A and 56B are applied to multipliers 71A, 71B, 72A and 72B, respectively, to be multiplied therein by suitable coefficients. The resulting modified or multiplied outputs of the multipliers 71A and 72A are added to each other in an adder 73A, and the outputs of the multipliers 71B and 72B are similarly added to each other in an adder 73B. It will be appreciated that, by suitably selecting the coefficients employed in the multipliers 71A and 71B as compared with the coefficients employed in the multipliers 72A and 72B, the outputs of the adders 73A and 73B can be provided with detection characteristics that are near to peak detection of the luminance signal levels in the respective exposure detection areas $AE_{21}$ and $AE_{22}$, or $AE'_{21}$ and $AE'_{22}$. Obviously, by changing the coefficients employed in the multipliers 71A and 71B and in the multipliers 72A and 72B, the detection levels can be varied. Since these computations are readily carried out by software, the detection levels can be easily changed.

On the basis of the value obtained by appropriately weighting and adding the detected value of the luminance signal level in the exposure detection area $AE_{21}$ or $AE'_{21}$ and the detected value of the luminance signal level in the exposure detection area $AE_{22}$ or $AE'_{22}$, opening and closing of the iris 18 and changing of the gain of the AGC circuit 8 are suitably controlled.

More particularly, as shown on FIG. 14, the outputs of the adders 73A and 73B are supplied to multipliers 74A and 74B, respectively, and the outputs of the multipliers 74A and 74B are added to each other in an adder 75, with the added output of the latter being applied to the system controller 12 as the exposure detection signal for determining the opening and closing of the iris 18 and the gain of the AGC circuit 8. It is to be noted that the multipliers 74A and 74B are provided for suitably weighting the detection value of the luminance signal level in one of the exposure detection areas, for example, the central area $AE_{21}$, and the detection value of the luminance signal level in the other exposure detection area, for example, the peripheral area $AE_{22}$. The weighting of the detection values in the multipliers 74A and 74B, respectively, is desirably dependent on the lighting conditions, for example, on whether the scene in the field of view of the video camera is being subjected to normal forward-lighting, back-lighting or excessive forward-lighting, as determined from the outputs $H_1$ and $H_2$ of the distribution detectors 58A and 58B, respectively.

In respect to the foregoing, it will be noted that normal forward-lighting of a scene in the field of view of the video camera results in substantially uniform brightness through the picture, that is, distribution of the luminance signal level in the exposure detection area $AE_{21}$ or $AE'_{21}$ which usually contains the principal object or objects, is substantially equal to that in the exposure detection area $AE_{22}$ or $AE'_{22}$ which contains the background of the picture. In other words, in the case of normal forward-lighting of the scene, the difference between the output $H_1$ of the distribution detector 58A and the output $H_2$ of the distribution detector 58B is not large.

On the other hand, when the scene in the field of view of the video camera is back-lighted, the background of the picture is extremely bright relative to objects in the foreground so that luminance signal levels above the predetermined value $V_3$ are mostly distributed in the peripheral exposure detection area $AE_{22}$ or the upper exposure detection area $AE'_{22}$. In other words, in the case of back-lighting, the output $H_2$ from the distribution detector 58B is large relative to the output $H_1$ from the distribution detector 58A.

Moreover, in the case of excessive forward-lighting of the scene in the field of view of the video camera, the background is dark relative to the very brightly lighted objects in the foreground. Therefore, in the case of excessive forward-lighting, luminance signal levels above the predetermined value $V_3$ are mostly distributed in the exposure detection area $AE_{21}$ or $AE'_{21}$ where the brightly illuminated objects are located, with the result that the output $H_1$ of the distribution detector 58A is then large relative to the output $H_2$ of the distribution detector 58B.

As shown in FIG. 14, the outputs $H_1$ and $H_2$ of the distribution detectors 58A and 58B are supplied to a brightness distribution state determining device 76 which, on the basis of a comparison of the outputs $H_1$ and $H_2$ relative to each other, determines whether the scene in the field of view of the video camera is being subjected to normal forward-lighting, back-lighting or excessive forward-lighting and, in response to such determination, provides corresponding outputs to the multipliers 74A and 74B for controlling or varying the coefficients employed therein.

More specifically, when the output $H_2$ is substantially greater than the output $H_1$ and the device 76 determines therefrom that the scene in the field of view of the video camera is subjected to back-lighting, the coefficient of the multiplier means 74A for weighting the detection luminance signal level of the portion of the picture containing the principal objects is set to a large value, while the coefficient of the multiplier 74B for weighting the detection luminance signal level of the background portion is set to a relatively small value. On the other hand, when the output $H_1$ is substantially larger than the output $H_2$ and the device 76 determines therefrom that the scene in the field of view of the video camera is subjected to excessive forward-lighting, the coefficient of multiplier 74A for weighting the brightness of the object portion is set to a relatively small value and the coefficient of the multiplier 74B for weighting the brightness of the background portion is set to a relatively large value. As a result of the foregoing, the auto-exposure control approximates center-emphasized photometry, and optimum auto-exposure control is achieved even when the scene is subjected to back-lighting or excessive forward-lighting.

Further, the brightness distribution state determining device 76 is effective, in response to the outputs $H_1$ and $H_2$ from the distribution detectors 58A and 58B, to determine the positions and dimensions of the exposure detection areas, that is, to determine whether the exposure detection areas $AE_{21}$ and $AE_{22}$ (FIGS. 17A and 17B) or the exposure detection areas $AE'_{21}$ and $AE'_{22}$ (FIGS. 18A and 18B), are to be employed.

More specifically, in the case of normal forward lighting, that is, when the difference, if any, between the outputs $H_1$ and $H_2$ is not large, the distribution state determining device 76 provides an output at 76a to the system controller 12 by which the latter selects the arrangement of the exposure detection areas shown in FIGS. 18A and 18B, that is, the arrangement in which the image projected on the CCD imaging device 8 is divided into an exposure detection area $AE'_{21}$ extending laterally across the lower portion of the entire image so as to contain the principal foreground objects, and an exposure detection area $AE'_{22}$ disposed vertically above the portion $AE'_{21}$ and also extending across the entire width of the image for containing the background. When the exposure detection areas $AE'_{21}$ and $AE'_{22}$ are selected in response to the normal forward-lighting of the scene, no variation occurs in the brightness as a principal object moves laterally, for example, between the positions $O_1$ and $O_2$ on FIGS. 18A and 18B, or in response to panning of the video camera, by reason of the fact that the principal objects remain within the exposure detection area $AE'_{21}$.

This may be contrasted with the arrangement of FIGS. 17A and 17B in which, in response to panning of the camera or movement of the object from $O_1$ to $O_2$, the object would move laterally out of the centrally located exposure detection area $AE_{21}$.

When the scene in the field of view of the video camera is subjected to back-lighting or excessive forward-lighting, the resulting relatively large difference between the outputs $H_1$ and $H_2$ causes the distribution state determining device 76 to provide its output 76a with a level indicating to the system controller 12 that back-lighting or excessive front-lighting has occurred, whereupon the system controller 12 selects the exposure detection areas $AE_{21}$ and $AE_{22}$ shown on FIGS. 17A and 17B. Thus, as previously noted, in the back-lighted and excessive forward-lighted conditions, the exposure detection area $AE_{21}$ which would contain a principal object is located at the center, whereas the exposure detection area $AE_{22}$ constitutes the peripheral portion and would contain the background. Apart from the different locations of the exposure detection areas in FIGS. 17A and 17B as compared with those in FIGS. 18A and 18B, it will be apparent that the exposure detection area $AE_{21}$ surrounded by the exposure detection $AE_{22}$ is of a substantially smaller size than the latter, whereas the exposure detection area $AE'_{21}$ is of a size that is at least as large as, or even slightly larger than the exposure detection area $AE'_{22}$. Due to the relatively smaller size of the centrally located exposure detection area $AE_{21}$, the exposure control effected with the exposure detection areas $AE_{21}$ and $AE_{22}$ of FIGS. 17A and 17B approximates the desired center-emphasized photometry.

The output of the brightness distribution state determining device 76 may also be used by the system controller 12 for controlling the turning point or knee $k_1$ of the knee circuit 51. More particularly, when the device 76 determines from the outputs $H_1$ and $H_2$ that the scene in the field of view of the video camera is back-lighted, the turning point $k_1$ is shifted downwardly, for example, to the position shown on FIG. 15A. By reason of such downward shifting of the characteristic curve of the knee circuit 51, the luminance detection signal corresponding to the high brightness of the background due to the back-lighting will be subjected to a reduced gain in the knee circuit 51 so that the resulting exposure control will ensure that objects in the foreground do not appear dark in the back-lighted condition. On the other hand, when the distribution state detecting device 76 senses from the outputs $H_1$ and $H_2$ that the scene in the field of view of the video camera is subjected to excessive forward-lighting, the turning point $k_1$ of the knee circuit 51 is raised, for example, to the position shown on FIG. 15B. Thus, in the excessive forward-lighting condition, the gain of the knee circuit 51 is increased in respect to the luminance detection signal corresponding to the objects of high brightness appearing in the foreground of the excessively forward-lighted scene. By reason of the corresponding increase in the exposure control signal the opening of the iris 18 and the gain of the AGC circuit 8 are reduced for ensuring that the principal objects in the foreground of the picture do not saturate when subjected to excessive forward-lighting.

It will be apparent from the foregoing that, in effect, the gain of the entire control system is set by the brightness distribution state determining device 76, that is, by changing the position of the knee $k_1$ of the knee device 51 as described above, and, as a result thereof, undesirable darkness of a principal object in the foreground of a back-lighted scene, and saturation of principal objects in the foreground of an excessively forward-lighted scene, are avoided.

It will be further appreciated that not all of the controls responsive to the back-lighting and excessive forward-lighting conditions are required. In other words, the problems associated with the back-lighting and excessive forward-lighting can be substantially avoided by employing one or more of the controls described above.

AUTOMATIC WHITE BALANCE DETECTOR 23

White balance control is generally carried out by controlling the levels of red (R), green (G) and blue (B) color signals so as to maintain a predetermined ratio thereof when viewing a white object or area. In the illustrated video camera according to an embodiment of the present invention, it is also possible to perform either fully automatic white balance control or so-called "one-push" auto white balance control. The fully automatic white balance control performs such control with reference to the integrated value of the entire picture which, for the purposes of the control, is assumed to be white. On the other hand, the one-push auto white balance control employs a white balance detection area $WB_1$ (FIG. 19A) which can be varied both in position and dimensions. Thus, the white balance detection area $WB_1$ can be located on a white part $W_1$ of an object in the scene in the field of view of the video camera, as on FIG. 19B whereupon, in response to actuation or pushing of an auto white balance setting button (not shown), white balance control is carried out on the basis of a signal derived during scanning of the white balance detection area $WB_1$.

Since the position and dimensions of the white balance detection area $WB_1$ can be changed as desired under the control of the system controller 12, the white balance control can be effected with reference to a white portion of any object, such as, clothes or the like, appearing in the scene in the field of view of the camera. Therefore, it is not necessary to perform white balance adjustment with reference to a white cap or the like inconveniently placed over the lens. White balance control with reference to a white portion of an object in the field of view of the video camera ensures more precise white balance adjustment than that achieved when white balance is effected with reference to the integrated value of the entire picture which is assumed to be white.

In effecting the one-push auto white balance control as generally described above, a plurality of white balance detection areas may be set or defined, and then the one of those white balance detection areas which approximates a so-called black body radiation curve is selected for actual use in achieving white balance control.

As shown specifically on FIG. 4, in the automatic white balance detector 23 of a video camera embodying this invention, the luminance signal Y from the Y separator circuit 32 is supplied through a gate circuit 61A to an integrator circuit 62A. The chrominance signals $C_R$ and $C_B$ from the C separator circuit 33 are supplied through gate circuits 61B and 61C to integrator circuits 62B and 62C, respectively. Outputs of the integrator circuits 62A, 62B and 62C are supplied, as automatic while balance detection signals, to the system controller 12 through the serial output port 29. The gate circuits 61A, 61B and 61C are supplied with gate enabling signals from the automatic white balance detection area setting circuit 26 for defining each white balance detection area. In the fully automatic white balance control mode, the white balance detection area is set by the circuit 26 to be substantially coextensive with the image projected on the CCD imaging device 8. In the one-push auto white balance control mode, the location and dimensions of the white balance detection area $WB_1$ are variably determined and set by the circuit 26 so as to correspond with a white part of the image projected on the CCD imaging device 8.

The system controller 12 performs the following calculations on the integrated values IN(Y), IN($C_R$) and IN($C_B$) of the luminance signal Y and the chrominance signals $C_R$ and $C_B$, derived from the integrator circuits 62A, 62B and 62C, respectively.

By subtracting integrated values IN($C_R$) and IN($C_B$) of the chrominance signals $C_R$ and $C_B$ from the integrated value IN(Y) of the luminance signal Y, an integrated value IN(G) of the green (G) color signal is obtained as follows:

$$IN(Y) - IN(C_R) - IN(C_B) = IN(3G + 2R + 2B) -$$
$$IN(2R - G) - IN(2B - G)$$
$$= IN(5G)$$

By adding the integrated value IN($C_R$) of the chrominance signal $C_R$ and the integrated value IN(G) of the green (G) color signal obtained in the foregoing process, integrated value IN(R) of the red (R) color signal is obtained as follows:

$$IN(C_R)+IN(G)=IN(2R-G)+IN(G)=IN(2R)$$

By adding the integrated value IN($C_B$) of the chrominance signal $C_B$ and the integrated value IN(G) of the green (G) color signal obtained in the foregoing process, integrated value IN(B) of the blue (B) color signal is obtained as follows:

$$IN(C_B)+IN(G)=IN(2B-G)-IN(G)=IN(2B)$$

The integrated values of the levels of the three-component color signals R, G and B obtained, as above, in the system controller 12 are communicated through a connection 12a to the processor 10, and employed in the latter, as in a conventional white balance control circuit, for determining the gains of the respective three-component color signals R, G and B that may be derived from the luminance and chrominance signals at the output terminals 16A and 16B (FIG. 1) so as to maintain a predetermined ratio of the levels of the three-component color signals R, G and B.

It will be appreciated from the above detailed description that, in accordance with this invention, there is provided a video camera having digital auto-focus, auto-exposure and auto-white balance controls all under the control of a common system controller with common input and output serial ports which are connected with auto-focus, auto-exposure and auto-white balance sections of a common optical detector circuit.

Further, it will be appreciated that, in the auto-exposure control of the video camera embodying this invention, the distribution of luminance signal levels is detected from the outputs $H_1$ and $H_2$ of the distribution detectors 58A and 58B, and the nature of the lighting, that is, back-lighting, excessive front-lighting or normal front-lighting, is accurately determined from the outputs $H_1$ and $H_2$ representing the detected distribution of luminance signal levels.

Moreover, in the auto exposure control arrangement embodying this invention, adaptation to back-lighting or to excessive front-lighting is effected in response to the distribution of the luminance signal levels detected by the distribution detectors 58A and 58B, as follows:

the positions and dimensions of the exposure detection areas $AE_{21}$ and $AE_{22}$ or $AE'_{21}$ and $AE'_{22}$ are determined in accordance with the distribution of the luminance signal levels represented by the outputs $H_1$ and $H_2$;

the coefficients of the multipliers 74A and 74B are determined in response to the detected distributions of the luminance signal levels represented by the outputs $H_1$ and $H_2$ of the detectors 58A and 58B, respectively, and thereby determine the relative weights given to the sum of the detection signals $P_1$ and $IN_1$ and the sum of the detection signals $P_2$ and $IN_2$ corresponding to the selected exposure detection areas $AE_{21}$ and $AE_{22}$ or $AE'_{21}$ and $AE'_{22}$, respectively; and the turning point or knee $k_1$ of the knee circuit 51 is determined in accordance with the distribution of the luminance signal levels as represented by the outputs $H_1$ and $H_2$ so that, in effect, the distribution of the luminance signal levels determines the overall gain of the exposure control system.

Although a preferred embodiment of the present invention and several modifications thereof have been described in detail herein with reference to the accompanying drawings, it is to understood that the invention is not limited to such embodiment and modifications, and that various changes and further variations could be effected therein by one skilled in the art without departing from the scope or spirit of the invention as defined in the appended claims.

What is claimed is:

1. In a color video camera having an image pickup device providing a video signal representing a scene in a field of view of the camera and which is sampled and digitized to provide a corresponding digital video signal; the combination of:

an optical detector comprising means for separating luminance and chrominance components from said digital video signal, auto-focus detection means for detecting signal levels of said luminance component and providing a focus detection signal, auto-exposure detection means for detecting signal levels of said luminance component and providing an exposure detection signal, auto-white-balance detection means for detecting signal levels of said luminance and chrominance components and providing therefrom white-balance detection signals, and serial input and output ports common to said auto-focus detection means, said auto-exposure detection means and said auto-white-balance detection means; and system controlling means common to said auto-focus detection means, said auto-exposure detection means and said auto-white-balance detection means, said system controlling means receiving said focus detection signal, said exposure detection signal and said white-balance detection signals through said serial output port and providing control signals through said serial input port to said auto-focus, auto-exposure and auto-white-balance detection means.

2. A color video camera according to claim 1; further comprising focus control means, exposure control means and white-balance control means; and wherein said system controlling means is responsive to said focus detection signal, said exposure detection signal and said white-balance detection signals for providing respective digital control signals to said focus control means, said exposure control means and said white-balance control means, respectively.

3. A color video camera according to claim 2; in which said exposure control means includes analog automatic gain control means acting on said video signal in advance of the digitizing thereof, digital-to-analog converting means receiving said respective digital control signal from said system controlling means and converting the same to an analog control signal for said automatic gain control means, adjustable iris means for controlling the amount of light incident on said image pickup device, and drive means for said adjustable iris means operable by said respective digital control signal from said system controlling means.

4. A color video camera according to claim 2; in which said exposure control means includes adjustable iris means for controlling the amount of light incident on said image pickup device; and in which said auto-exposure detection means includes means for defining a plurality of exposure detection areas corresponding to respective portions of said scene in the field of view of the camera, first detector means for detecting levels of said luminance component corresponding to said exposure detection areas, respectively, means for providing said exposure detection signal from outputs of said first detector means, second detector means for detecting distributions of said levels of the luminance components corresponding to said exposure detection area, respectively, as an indication of a lighting condition of said scene, and means for controlling positions and dimensions of said exposure detection areas relative to each other in response to said second detector means.

5. A color video camera according to claim 4; further comprising means for relatively weighting outputs of said first detector means which represent levels of said luminance component corresponding to said exposure detection areas, respectively.

6. A color video camera according to claim 5; in which said first detector means includes a peak detector and an integration detector for each of said exposure detection areas; and further comprising means for relatively weighting outputs of said peak detector and said integration detector for each of said exposure detection areas.

7. A video camera comprising:
image pickup means having a light reception surface for providing a luminance signal corresponding to a light image projected on said surface;
lens means for directing incident light onto said surface in the form of an image corresponding to a scene in the field of view of said lens means;
exposure means for controlling the amount of said light incident on said surface;
means for defining at least one exposure detection area of said surface;
detector means for detecting levels and distribution of said luminance signal corresponding to each said exposure detection area; and
control means for controlling said exposure means in accordance with an output of said detector means.

8. A video camera according to claim 7; in which said control means includes means for controlling the position and dimensions of each said exposure detection area in response to an output from said detector means.

9. A video camera comprising:
image pickup means having a light reception surface for providing a luminance signal corresponding to a light image projected on said surface;
lens means for directing incident light onto said surface in the form of an image corresponding to a scene in the field of view of said lens means;
exposure means for controlling the amount of said light incident on said surface;
means for defining a plurality of exposure detection areas corresponding to respective portions of said light reception surface;
first detector means for detecting levels of said luminance signal corresponding to said exposure detection areas, respectively;
second detector means for detecting distributions of said levels of the luminance signal corresponding to said exposure detection areas, respectively, as an indication of a lighting condition of said scene;
control means for controlling said exposure means in response to said first detector means; and
means for controlling positions and dimensions of said exposure detection areas relative to each other in response to said second detector means.

10. A video camera according to claim 9; further comprising means for supplying to said second detector means only said levels of said luminance signal which exceed a predetermined threshold value.

11. A video camera according to claim 9; wherein said means for defining a plurality of exposure detection areas is operative to selectively define first and second exposure detection areas which respectively correspond to central and peripheral portions of said light reception surface, or third and fourth exposure detection areas which respectively correspond to portions of said light reception surface extending thereacross one above the other; and wherein said means for controlling positions and dimensions of said exposure detection areas selects said first and second areas when said second detector means detects distributions of said levels of the luminance signal which indicate back-lighting or excessive front-lighting of said scene, and selects said third and fourth areas when said second detector means detects distributions of said levels of the luminance signal which indicate normal front-lighting of said scene.

12. A video camera according to claim 9; further comprising non-linear transfer means through which said luminance signal is applied to said first detector means for each of said exposure detection areas, said non-linear transfer means having a characteristic for relatively reducing the effects of high amplitudes of said luminance signal.

13. A video camera according to claim 12; further comprising means responsive to said second detector means for changing said characteristic of said non-linear transfer means.

14. A video camera according to claim 9; further comprising means for relatively weighting outputs of said first detector means which represent levels of said luminance signal corresponding to exposure detection areas, respectively.

15. A video camera according to claim 14; in which said first detector means includes a peak detector and an integration detector for each of said exposure detection areas; and further comprising means for relatively weighting outputs of said peak detector and said integration detector for each of said exposure detection areas.

16. A video camera according to claim 15; further comprising non-linear transfer means through which said luminance signal is applied to said integration detector for each of said exposure detection areas, said non-linear transfer means having a characteristic for relatively reducing the effects of high amplitudes of said luminance signal on said outputs of the integration detectors.

17. A video camera according to claim 16; further comprising means responsive to said second detector means for changing said characteristic of said non-linear transfer means.

18. A video camera according to claim 19; wherein said means for defining a plurality of exposure detection areas is operative to selectively define first and second exposure detection areas which respectively correspond to central and peripheral portions of said light reception surface, or third and fourth exposure detection areas which respectively correspond to portions of said light reception surface extending thereacross one above the other; and wherein said means for controlling positions and dimensions of said exposure detection areas selects said first and second areas when said second detector means detects distributions of said levels of the luminance signal which indicate back-lighting or excessive front-lighting of said scene, and selects said third and fourth areas when said second detector means detects distributions of said levels of the luminance signal which indicate normal front-lighting of said scene.

* * * * *